(12) United States Patent
Huh et al.

(10) Patent No.: US 10,133,381 B2
(45) Date of Patent: Nov. 20, 2018

(54) DISPLAY APPARATUS

(71) Applicant: SAMSUNG ELECTRONICS CO., LTD., Suwon-si (KR)

(72) Inventors: Jae Young Huh, Seoul (KR); Kyung Wan Park, Suwon-si (KR); Hee Seok Jeong, Suwon-si (KR); Seung Soo Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 99 days.

(21) Appl. No.: 15/246,017

(22) Filed: Aug. 24, 2016

(65) Prior Publication Data

US 2016/0364055 A1 Dec. 15, 2016

Related U.S. Application Data

(63) Continuation of application No. 14/990,342, filed on Jan. 7, 2016, now abandoned.
(Continued)

(30) Foreign Application Priority Data

Sep. 14, 2015 (KR) ........................ 10-2015-0129958

(51) Int. Cl.
*G09G 5/00* (2006.01)
*G06F 3/041* (2006.01)
(Continued)

(52) U.S. Cl.
CPC .......... *G06F 3/0412* (2013.01); *G06F 1/1652* (2013.01); *G06F 1/1694* (2013.01);
(Continued)

(58) Field of Classification Search
CPC .... G06F 3/0412; G06F 3/04847; G06F 1/188; G06F 1/1652; G06F 1/1694;
(Continued)

(56) References Cited

U.S. PATENT DOCUMENTS

| | | | | |
|---|---|---|---|---|
| 5,739,946 A | * | 4/1998 | Iwanaga | G02B 26/004 204/450 |
| 8,275,327 B2 | * | 9/2012 | Yi | G04G 21/04 455/556.1 |

(Continued)

FOREIGN PATENT DOCUMENTS

| KR | 10-2013-0113784 A | 10/2013 |
|---|---|---|
| KR | 10-2013-0120580 A | 11/2013 |

(Continued)

OTHER PUBLICATIONS

Communication dated Apr. 27, 2016 issued by the International Searching Authority in counterpart International Application No. PCT/KR2016/000083 (PCT/ISA/210).
(Continued)

*Primary Examiner* — Prabodh M Dharia
(74) *Attorney, Agent, or Firm* — Sughrue Mion, PLLC

(57) ABSTRACT

A display apparatus includes a flexible display panel; an image processing board configured to output a video signal to the display panel; and a support member provided between the display panel and the image processing board and configured to support the display panel, the support member including: at least two plates arranged along one side of the display panel; and at least one artificial muscle connecting the at least two plates and configured to be deformed to change a shape of the support member in accordance with a voltage applied thereto.

25 Claims, 45 Drawing Sheets

Related U.S. Application Data

(60) Provisional application No. 62/100,579, filed on Jan. 7, 2015.

(51) Int. Cl.
    *G06F 1/16*           (2006.01)
    *G06F 3/0484*       (2013.01)
    *G06F 1/18*           (2006.01)

(52) U.S. Cl.
    CPC .......... *G06F 1/188* (2013.01); *G06F 3/04847* (2013.01); *G09G 5/00* (2013.01); *G09G 5/006* (2013.01); *G09G 2354/00* (2013.01); *G09G 2380/02* (2013.01)

(58) Field of Classification Search
    CPC ...... G09G 2354/00; G09G 5/006; G09G 5/00; G09G 2380/02
    USPC ..................... 345/156–184; 40/488; 204/450
    See application file for complete search history.

(56) References Cited

U.S. PATENT DOCUMENTS

| | | | |
|---|---|---|---|
| 8,587,539 B2 | 11/2013 | Tziortzis et al. | |
| 8,593,420 B1* | 11/2013 | Buuck | G06F 3/016 345/173 |
| 8,970,455 B2* | 3/2015 | Thorson | G06F 3/147 345/105 |
| 9,829,733 B2* | 11/2017 | Seen | H04M 1/0268 |
| 2002/0067591 A1* | 6/2002 | Tajima | H04N 5/64 361/679.21 |
| 2006/0236573 A1* | 10/2006 | Bognar | G09F 11/00 40/488 |
| 2008/0097159 A1* | 4/2008 | Ishiguro | A61B 1/0051 600/145 |
| 2009/0284448 A1* | 11/2009 | Tamura | G09F 9/313 345/60 |
| 2010/0011641 A1* | 1/2010 | Hill | G09F 1/06 40/606.12 |
| 2010/0148164 A1* | 6/2010 | La Rosa | F03G 7/005 257/40 |
| 2011/0043976 A1 | 2/2011 | Visser et al. | |
| 2011/0227822 A1 | 9/2011 | Shai | |
| 2013/0083496 A1 | 4/2013 | Franklin et al. | |
| 2013/0093660 A1* | 4/2013 | Hirsch | G06F 1/1652 345/156 |
| 2013/0170115 A1* | 7/2013 | Jung | G02F 1/00 361/679.01 |
| 2013/0170157 A1 | 7/2013 | Park | |
| 2013/0222349 A1 | 8/2013 | Baek et al. | |
| 2013/0285921 A1* | 10/2013 | Alberth, Jr. | G06F 1/1652 345/173 |
| 2014/0003006 A1 | 1/2014 | Ahn | |
| 2014/0104216 A1* | 4/2014 | Adachi | G06F 3/041 345/173 |
| 2014/0118271 A1* | 5/2014 | Lee | G06F 3/0488 345/173 |
| 2015/0234188 A1* | 8/2015 | Lee | G02B 27/0172 345/633 |
| 2016/0127836 A1* | 5/2016 | Zaitsu | H04R 7/045 455/550.1 |
| 2016/0195902 A1* | 7/2016 | Huh | G06F 1/1652 345/156 |
| 2017/0215288 A1* | 7/2017 | Shi | H05K 1/189 |

FOREIGN PATENT DOCUMENTS

| | | |
|---|---|---|
| KR | 10-2015-0031399 A | 3/2015 |
| WO | 2006/089377 A1 | 8/2006 |
| WO | 2011/117681 A1 | 9/2011 |
| WO | 2014/030963 A1 | 2/2014 |
| WO | 2016/111536 A1 | 7/2016 |

OTHER PUBLICATIONS

International Search Report (PCT/ISA/210) dated Jan. 26, 2017, issued by the International Searching Authority in counterpart International Application No. PCT/KR2016/009432.

\* cited by examiner

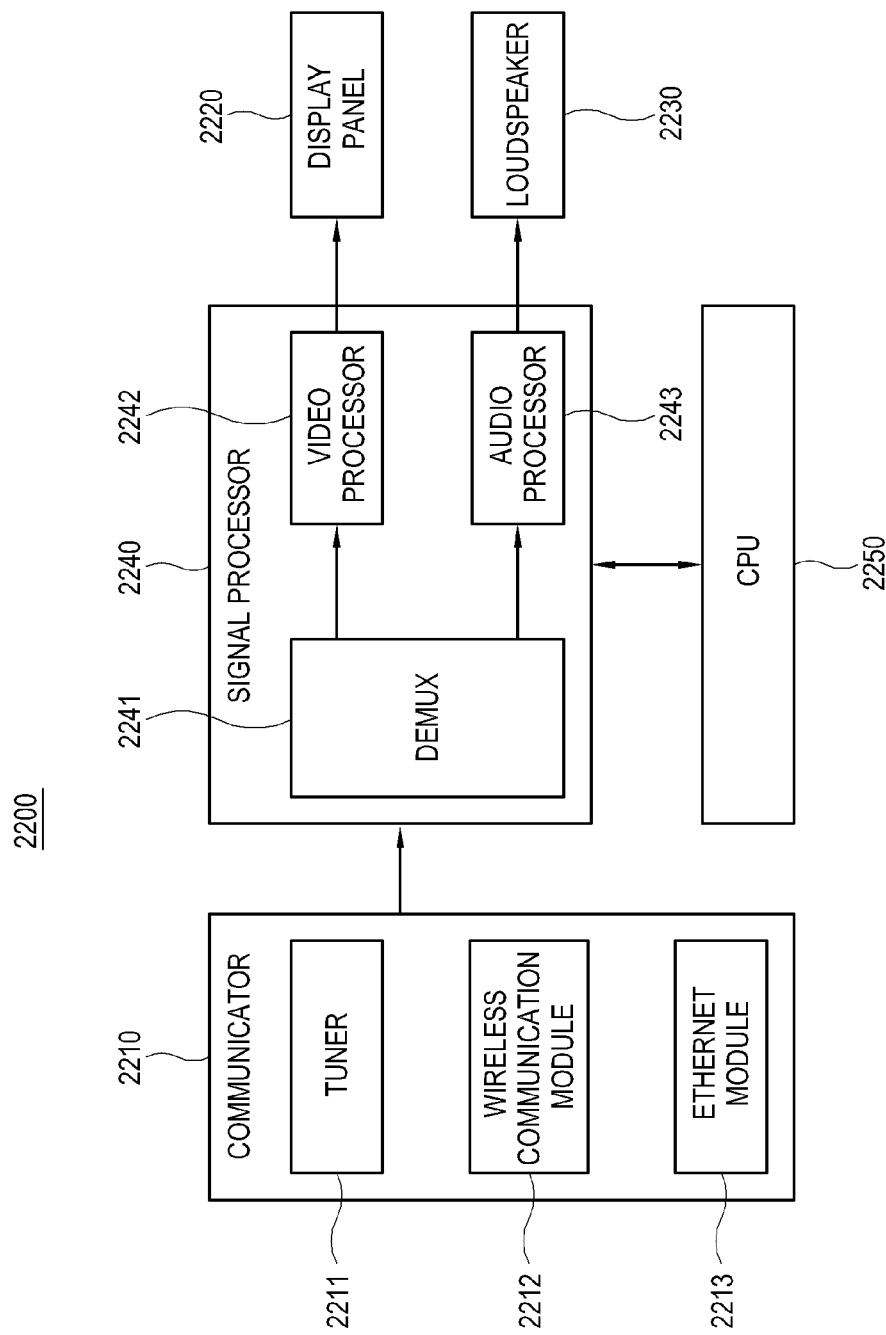

DISPLAY APPARATUS

CROSS-REFERENCE TO RELATED APPLICATION

This is a continuation of U.S. application Ser. No. 14/990,342 filed Jan. 7, 2016, which claims priority from U.S. Provisional Application No. 62/100,579, filed on Jan. 7, 2015 in the United States Patent and Trademark Office, and Korean Patent Application No. 10-2015-0129958, filed on Sep. 14, 2015 in the Korean Intellectual Property Office, the disclosures of which are incorporated herein by reference.

BACKGROUND

Field

Apparatuses and methods consistent with exemplary embodiments relate to a display apparatus, and more particularly to a display apparatus having a bendable structure in which an overall shape is not fixed and the whole apparatus including a plate of a display panel is flexible as desired by a user.

Related Art

To process information in accordance with a certain process, an electronic apparatus, which typically includes and utilizes electronic elements such as a central processing unit (CPU), a chipset, a memory and the like, may be classified into various kinds of apparatuses in accordance with what information will be processed therein. For example, the electronic apparatus includes an information processing apparatus such as a personal computer, a server, etc. for processing universal information; an image processing apparatus for processing video information, etc.

The image processing apparatus processes a video signal or video data received from an exterior in accordance with various image processing processes. The image processing apparatus may include a display panel to display an image based on the processed video data, or output the processed video data to a display apparatus including a display panel so that the image can be displayed on the display apparatus. The image processing apparatus including the display panel may be referred to as a display apparatus, and may be a television (TV), a monitor, a portable multimedia player, a tablet, a mobile phone, etc. as an example of the display apparatus. Further, the display apparatus may have a large size and be installed at a stationary position like a TV, or may have a small size such that it be carried easily by a user like a tablet or a mobile phone.

In terms of implementation, the display apparatus generally has a rigid structure. For instance, a mobile type display apparatus includes a housing for forming an outer appearance, a display panel, an image processing board for processing a video signal to be displayed as an image on the display panel, and a battery for supplying power, and these elements generally include rigid materials. Therefore, a general display apparatus has a rigid structure that is not bendable as may be desired by a user, and the display panel has a flat surface.

However, with various kinds of contents and various demands of users, the display apparatus has been required to have a rigid structure of a curved display panel or a flexible structure. In particular, the latter case is more difficult to implement since all the elements of the display apparatus such as the housing, the image processing board, etc. need to be flexible. Although all the elements of the display apparatus are flexible, many problems, which are not caused in the rigid structure, may arise while the display apparatus is used.

SUMMARY

According to an aspect of an exemplary embodiment, there is provided display apparatus including: a flexible display panel; an image processing board configured to output a video signal to the display panel; and a support member provided between the display panel and the image processing board and configured to support the display panel, the support member including: at least two plates arranged along one side of the display panel; and at least one artificial muscle connecting the at least two plates and configured to be deformed to change a shape of the support member in accordance with a voltage applied thereto.

The display apparatus may further includes: at least one sensor configured to sense a bending state of the artificial muscle when the artificial muscle is bent by an external force; and a controller provided in the image processing board and configured to apply the voltage to the artificial muscle so that the artificial muscle can maintain the bending state in response to the sensor sensing that the artificial muscle is bent.

The controller may be configured to apply the voltage to the artificial muscle in response to the bending state of the artificial muscle being maintained by the external force for a preset period of time from a point of time when the artificial muscle is bent to a certain shape.

The display apparatus may further include a storage configured to store a plurality of voltage levels respectively designated to maintain a plurality of transformed shapes of the artificial muscle, and the controller may be configured to read a voltage level, which corresponds to the bending shape of the artificial muscle sensed by the sensor, from the storage and apply a voltage of the read voltage level to the artificial muscle.

The sensor may be configured to sense whether the external force is caused by a user, and the controller may be configured to apply the voltage to the artificial muscle in response to the sensor sensing that the external force is caused by a user, and to not apply the voltage to the artificial muscle in response to the sensor sensing that the external force is not caused by the user.

The sensor may be configured to sense at least one from among a bending angle, a bending duration time and a bending pressure of the artificial muscle.

The display apparatus may further include a controller configured to control the display panel to display a user interface (UI) through which a user can designate the bending shape of the support member, and to apply the voltage to the artificial muscle so that the support member can be bent in response to user input from the UI.

The display apparatus may further include a storage configured to store a plurality of voltage levels respectively designated to maintain a plurality of transformed shapes of the artificial muscle, and the controller may be configured to read a voltage level, which corresponds to the bending shape of the artificial muscle sensed by the sensor, from the storage and apply voltage of the read voltage level to the artificial muscle.

The at least one artificial muscle may include a pair of artificial muscles arranged in parallel with each other and connecting the at least two plates.

The channel support member may further include a supporting plate configured to support an untransformable area between a transformable area and the untransformable area of the display apparatus, and the at least two plates and the at least one artificial muscle support the first area.

The image processing board may be accommodated in the untransformable area.

The display apparatus may further include a housing including at least one hinge at which the display apparatus can be bent; and at least one battery accommodated in an area separate from the hinges of the housing so as not to interfere with a bending operation of the housing.

The image processing board may include: a plurality of flexible substrates arranged in parallel with a rear surface of the display panel; a flexible die forming gaps with regard to the plurality of substrates and arranged between the plurality of substrates in parallel with the display panel; and a flexible wiring film supporting upper surfaces of the die and the plurality of substrates and electrically connecting the plurality of substrates and the die.

At least one cavity may be formed along lower surfaces of at least one of the plurality of substrates and the die.

The image processing board may further include a bonding film that bonds the plurality of substrates and the die and electrically connects the plurality of substrates and the die to wiring film, and the bonding film may include: a bonding member arranged in a row along an extending direction of the wiring film and bonding the plurality of substrates and the die to the wiring film; and an electric conductor embedded in the bonding member and electrically connected to a wiring line of the wiring film.

The bonding film may include a plurality of unit films arranged in a row along the extending direction of the wiring film, and each unit film of the plurality of includes the electric conductor and the bonding member.

At least one cavity may be formed along at least one of an upper surface and a lower surface of the bonding member.

The mage processing board may include: a flexible substrate arranged in parallel with a rear surface of the display panel and having an accommodating area formed by a recess in an area of an upper surface of the flexible substrate; a flexible die accommodated in the accommodating area to form a gap with regard to the substrate and arranged in parallel with the rear surface of the display panel; and a flexible wiring film supporting upper surfaces of the die and the substrate and electrically connecting the substrate and the die.

At least one cavity may be formed along a lower surface of at least one of the substrate and the die.

The image processing board may further include a bonding film that bonds the substrate and the die and electrically connects the substrate and the die to wiring film, and the bonding film may include: a bonding member arranged in a row along an extending direction of the wiring film and bonding the substrate and the die to the wiring film; and an electric conductor embedded in the bonding member and electrically connected to a wiring line of the wiring film.

The bonding film may include a plurality of unit films arranged in a row along the extending direction of the wiring film and including the electric conductor and the bonding member.

At least one cavity may be formed along at least one of an upper surface and a lower surface of the bonding member.

BRIEF DESCRIPTION OF THE DRAWINGS

The above and/or other aspects will become apparent and more readily appreciated from the following description of exemplary embodiments, taken in conjunction with the accompanying drawings, in which:

FIG. 45 is a block diagram of the image processing board in the display apparatus according to an exemplary embodiment.

DETAILED DESCRIPTION OF EXEMPLARY EMBODIMENTS

Below, exemplary embodiments will be described in detail with reference to accompanying drawings. The following descriptions of the exemplary embodiments are made by referring to elements shown in the accompanying drawings, in which like numerals refer to like elements having substantively the same functions.

In the description of the exemplary embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the idea of the invention.

Further, the exemplary embodiments will describe only elements directly related to the idea of the invention, and description of the other elements will be omitted. However, it will be appreciated that the elements, the descriptions of which are omitted, are not unnecessary to realize the apparatus or system according to the exemplary embodiments. In the following descriptions, terms such as "include" or "have" refer to presence of features, numbers, steps, operations, elements or combination thereof, and do not exclude presence or addition of one or more other features, numbers, steps, operations, elements or combination thereof.

Figure 1:
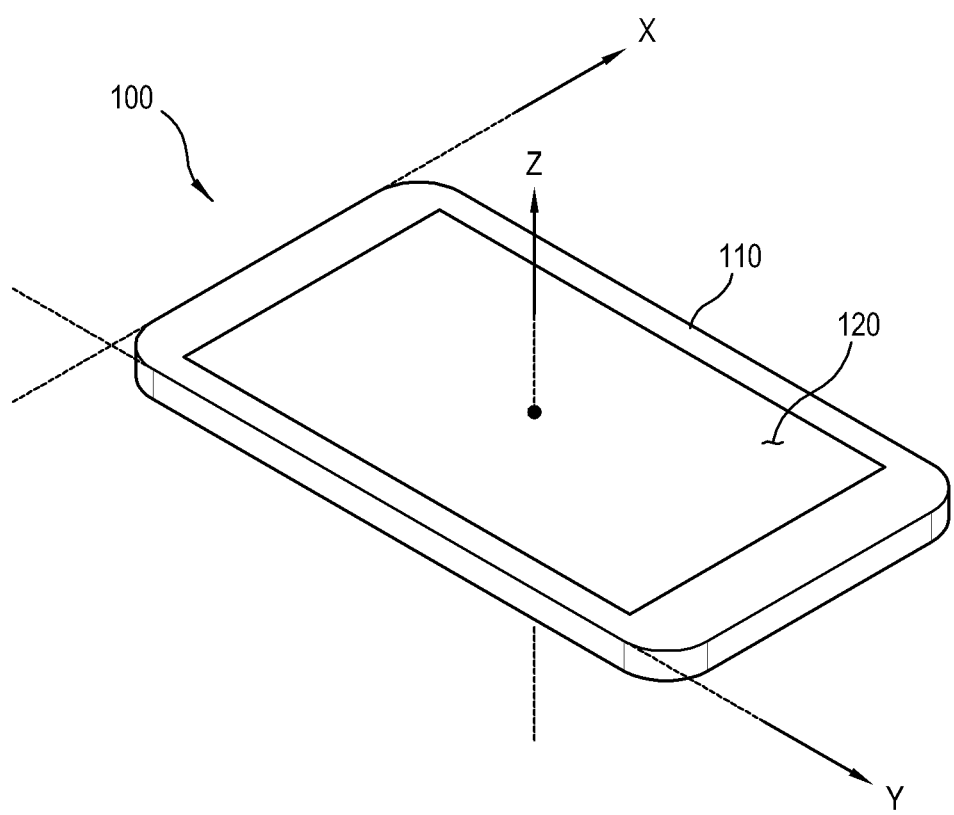
FIG. 1 is a perspective view of illustrating a display apparatus according to an exemplary embodiment.

FIG. 1 is a perspective view of illustrating a display apparatus 100 according to an exemplary embodiment.

As shown in FIG. 1, the display apparatus 100 according to an exemplary embodiment will be described as a mobile type apparatus that is easy to carry by a user. However, the mobile type apparatus is nothing but an example of the display apparatus 100. Thus, it will be appreciated that the present inventive concept is applicable to various display apparatuses as well as the mobile type apparatus. The display apparatus 100 includes a housing 110, and a display panel 120 supported by the housing 110 and displaying an image. Elements other than the display panel 120, which constitute the display apparatus 100 will be described later.

In the accompanying drawings, directions are indicated as follows. An X direction refers to a widthwise direction of the display apparatus 100, a Y direction refers to a lengthwise direction of the display apparatus 100, and a Z direction refers to a normal direction to the surface of the display apparatus 100. The opposite directions to the X direction, the Y direction and the Z direction are respectively represented as a –X direction, a –Y direction and a –Z direction.

For example, if the display panel 120 of the display apparatus 100 is flat, the display panel 120 has a display surface parallel with an X-Y plane. While a user views an image on the display panel 120, his/her eyes look at a predetermined position schematically spaced apart from the display panel 120 in a Z direction.

If the display panel 120 has a flat structure and the display apparatus 100 is rigid, the display apparatus 100 is maintained to have a surface parallel with the X-Y plane. In addition, if the display panel 120 has a curved structure and the display apparatus 100 is rigid, the display apparatus 100 is maintained to have a surface curved with regard to the X-Y plane. In any case, the display apparatus 100 is not deformable by a user as long as it has a rigid structure.

However, if the display apparatus 100 has a flexible structure, the display apparatus 100 may be bent as desired by a user.

Figure 2:
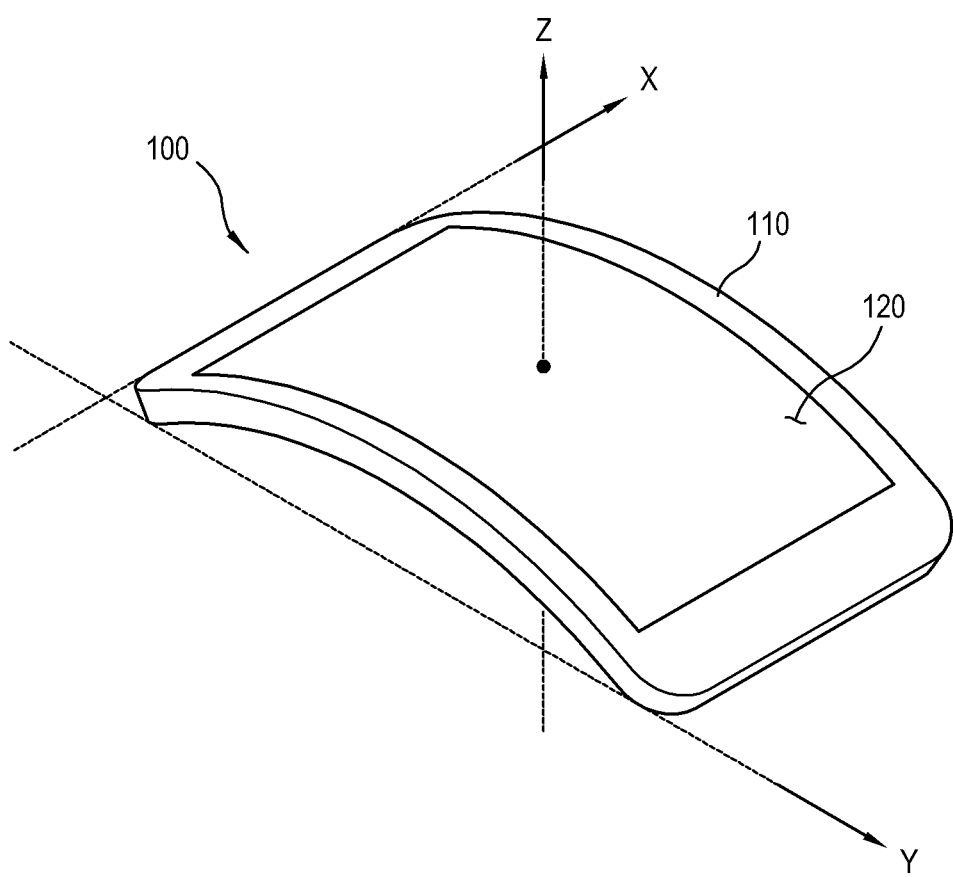
FIG. 2 is a perspective view of illustrating that the display apparatus according to an exemplary embodiment is flexibly bent.

FIG. 2 is a perspective view of illustrating that the display apparatus 100 according to an exemplary embodiment is flexibly bent.

As shown in FIG. 2, the display apparatus 100 having the flexible structure may for example be convexly bent in the Z direction. The display apparatus 100 is not limited to only the bent form as shown in FIG. 2. Alternatively, the display apparatus 100 may be concavely bent in the Z direction or irregularly bent in a certain area. Such a bent form is caused by the structure of the display apparatus 100 and an external force applied to the display apparatus 100.

To achieve the flexible structure of the display apparatus 100, the flexible structure has to be applied to not some but all elements of the display apparatus 100. That is, the housing 110, the image processing board, the battery, etc. as well as the display panel 120 are required to be flexible in the display apparatus 100 so as to be bent as shown in FIG. 2.

Below, an internal structure of the display apparatus 100 will be described.

Figure 3:
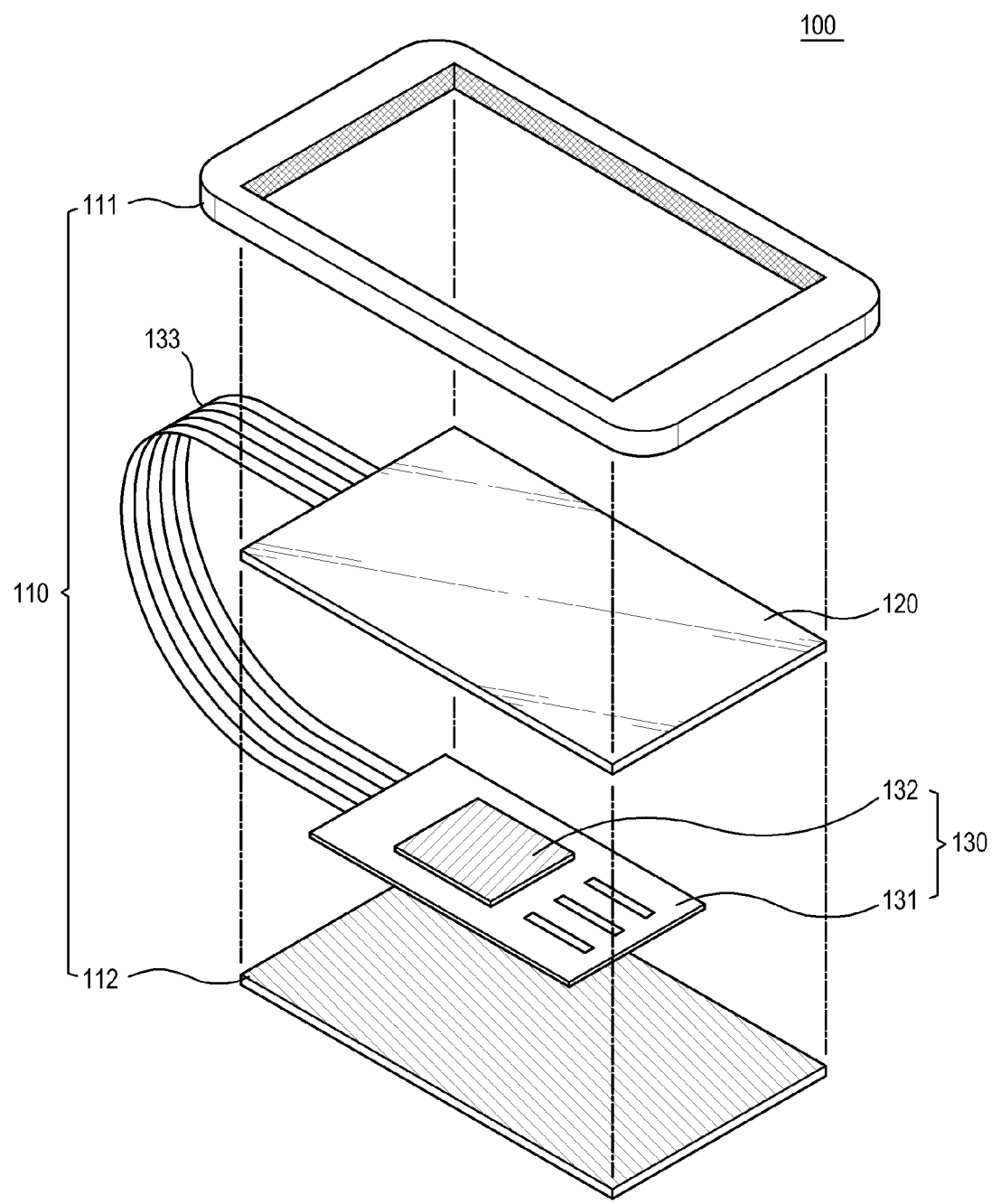
FIG. 3 is an exploded perspective view of showing an internal structure of the display apparatus according to an exemplary embodiment.

FIG. 3 is an exploded perspective view of showing the internal structure of the display apparatus 100 according to an exemplary embodiment.

As shown in FIG. 3, the display apparatus 100 includes the housing 110 for forming an outer appearance of the display apparatus 100, the display panel 120 for displaying an image on the surface thereof, and an image processing board 130 for processing and supplying a video signal to the display panel 120. To realize the display apparatus 100, a battery and the like extra elements are needed in addition to the foregoing elements. However, only basic elements of the display apparatus 100 will be representatively explained for the simple and clear description.

The housing 110 forms an accommodating space to accommodate and support overall elements of the display apparatus 100, such as the display panel 120 and the image processing board 130, while forming the outer appearance of the display apparatus 100. The housing 110 is includes an upper housing 111 and a lower housing 112 to be easily assembled and disassembled, and forms the accommodating space when the upper housing 111 and the lower housing 112 are assembled. In particular, the upper housing 111 has an opening through which a displaying surface, on which an image is displayed, of the display panel 120 is exposed to the outside.

The display panel 120 displays an image based on a video signal output from the image processing board 130 via a cable 133. The type of the display panel 120 is not limited to a certain type, but a self-emissive panel structure such as an organic light emitting diode (OLED) may be utilized considering that the display panel is flexible upon application an external force. If the display panel 120 cannot emit light by itself like a liquid crystal display (LCD) panel, a backlight unit for emitting light is additionally needed, and it may be therefore difficult to realize the flexible structure of the display apparatus 100.

The image processing board 130 processes a video signal in accordance with various image processing processes, and outputs the processed video signal to the display panel 120 through the cable 133. The image processing board 130 is implemented as an integrated circuit by mounting a die 132 and forming a wiring line on a substrate 131. The video signal may be received from an external source or internally stored. Functions related to the image processing processes to be performed in the image processing board 130 will be described later.

The die 132 refers to a rectangular piece of a semiconductor material where a circuit is formed. In general, many integrated circuits are formed on one wafer, and the wafer is cut in units of an integrated circuit, in which each unit piece forms the integrated circuit. Such a unit piece will be called the die 132.

The substrate 131 is formed by stacking a plurality of conductive plates on which conductors are printed. Dielectric layers are respectively interposed between the conductive plates so that the conductive plates are electrically isolated from each other. The conductors of the respective conductive plates are electrically connected through via. The die 132 is mounted on to the substrate 131, and an interconnection structure is formed for input/output between the substrate 131 and the die 132. When the die 132 is mounted and the wiring lines are completed on the substrate 131, the image processing board 130, which will be called a printed circuit assembly (PCA), a printed board assembly (PBA) or a printed circuit board assembly (PCBA), is formed.

To make the display apparatus 100 bendable by an external force of a user, the housing 110, the display panel 120, the image processing board 130 and other elements are all required to have a flexible structure. To this end, the housing 110, the display panel 120, the cable 133, the die 132, and the substrate 131 may include a flexible material.

However, even if the display apparatus 100 has the flexible structure, stress due to repetitive bending operations may cause problems as follows.

Figure 4:
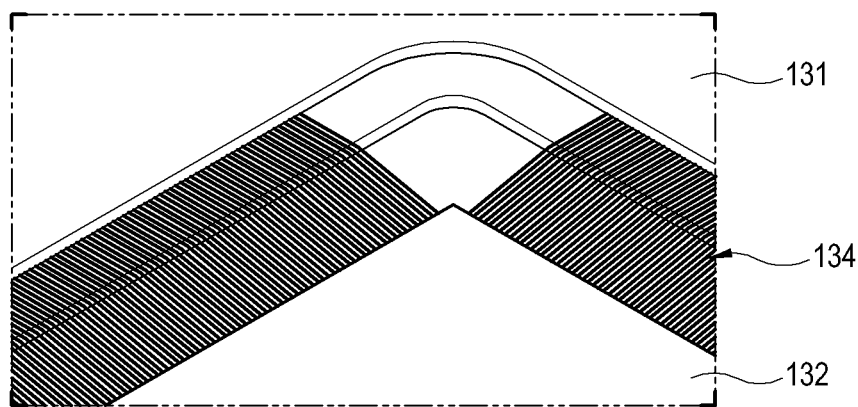
FIG. 4 is a partial cross-section view of showing an interconnection structure between a die and a substrate in the display apparatus according to an exemplary embodiment.

FIG. 4 is a partial cross-section view of showing an interconnection structure between a die 132 and a substrate 131 in the display apparatus 100 according to an exemplary embodiment.

As shown in FIG. 4, the interconnection structure for input and output of a signal is provided between the die 132 and the substrate 131, and such interconnection is achieved by a plurality of wiring lines for electrically connecting the die 132 and the substrate 131.

If the display apparatus 100 is bent, the die 132 and the substrate 131 are also bent, thereby applying tension between the plurality of wiring lines 134. If the stress is accumulated as the number of repetitive bending operations increases, some wiring lines 134 may be disconnected. The disconnection of the interconnection does not matter if the number of wiring lines 134 is small. However, if the number of wiring lines 134 is large for a high input/output interface, the disconnection does matter. Since the large number of wiring lines 134 means that the size of die 132 is relatively large, it is likely to cause a crack in an area, to which the wiring lines 134 are connected, due to the bending stress.

Similarly, the stress due to the bending operations may cause the interconnection structure between the die 132 and the substrate 131 to be disconnected even if the die 132 and the substrate 131 are made of the flexible material. Therefore, it is important to prevent the disconnection in the display apparatus 100 having the flexible structure.

Figure 5:
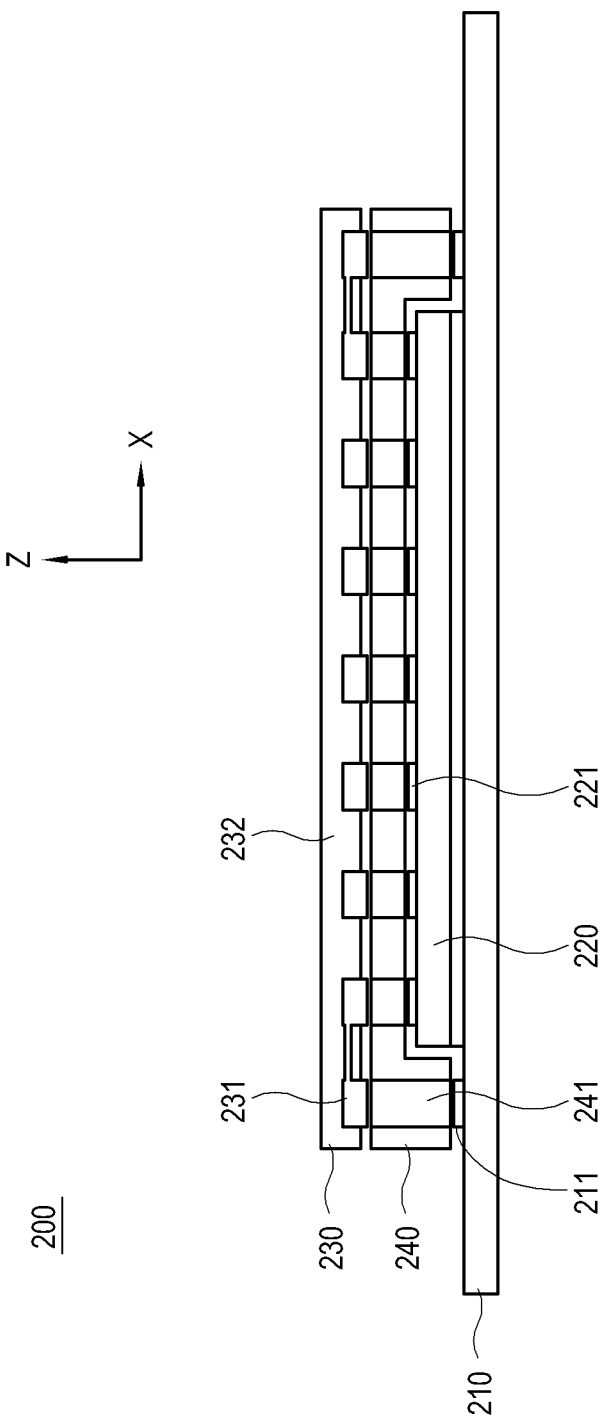
FIG. 5 is a lateral cross-section view of showing an interconnection structure between the die and the substrate in the display apparatus according to an exemplary embodiment.

FIG. 5 is a lateral cross-section view of showing an interconnection structure between a die 210 and a substrate 220 in a display apparatus 200 according to an exemplary embodiment.

As shown in FIG. 5, the display apparatus 200 according to an exemplary embodiment includes the substrate 210, the die 220 stacked on the substrate 210, a stretchable film 230 stacked on the substrate 210 and the die 220, and a bonding film 240 for bonding the substrate 210 and the die 220. Unlike to the foregoing wiring lines 134 (see FIG. 4), the interconnection structure the substrate 210 and the die 220 according to this embodiment is achieved by the stretchable film 230 and the bonding film 240.

The stretchable film 230 is arranged to cover the upper sides of the die 220 and the substrate 210 in the state that the die 220 is stacked on the substrate 210. That is, the stretchable film 230 is interposed between the substrate 210 and the display panel. The stretchable film 230 is realized in such a manner that the wiring lines 231 for electrically connecting the die 220 and the substrate 210 are embedded in a stretchable insulation film 232. Here, the wiring lines 231 may be made of a material, which is stretchable corresponding to the bending operation of the display apparatus 200, and may for example include silver (Ag) nano-wires.

Here, the wiring lines 231 of the stretchable film 230 are used for electrically connecting the terminal 211 of the substrate 210 and the terminal 221 of the die 220. The respective terminals 221 and 221 of the substrate 210 and the die 220 are also called pads. The stretchable film 230 is not sufficient to support the substrate 210 and the die 220, and therefore the bonding film 240 is additionally applied to the interconnection structure.

The upper surface of the substrate 210 and the lower surface of the die 220, which face each other, may be bonded by an adhesive tape. Further, the die 220, the substrate 210 and the stretchable film 230 are bonded by the bonding film 240, and therefore a bonding structure may be not needed between the upper surface of the substrate 210 and the lower surface of the die 220.

The bonding film 240 bonds the substrate 210, the die 220 and the stretchable film 230 to one another by bonding at least some areas of the upper surface of the substrate 210 and the upper surface of the die 220 to the lower surface of the stretchable film 230. Further, the bonding film 240 includes an electric conductor 241 embedded in a bonding material, and the electric conductor 241 electrically connects a terminal 211 of the substrate 210 and a terminal 221 of the die 220 to the wiring lines 231 of the stretchable film 230, respectively. Thus, the die 220 and the substrate 210 are electrically connected to each other through the stretchable film 230 and the bonding film 240.

The bonding film 240 may have various structures. For example, the bonding film 240 may be an anisotropic conducting film (ACF). The ACF is a film formed by distributing conductive particles in rubber, which exhibits a conducting characteristic in a thickness direction, i.e., the Z direction but exhibits an insulating characteristic in a transverse direction, i.e., the X-Y direction. Here, conductive particles include nickel, gold or similar metal particles, or high molecular particles coated with the like metal.

If predetermined heat and pressure are applied after arranging the ACF between the circuits to be bonded, the circuit terminals are electrically connected by the conductive particles. On the other hand, a space between the adjacent circuits is filled with an insulating adhesive resin so that the conductive particles can be placed independently of each other, thereby providing a high insulating characteristic.

Alternatively, the bonding film 240 may be formed by embedding metal or carbon fiber in the adhesive resin in a vertical direction.

With this structure, the display apparatus 200 may be bent flexibly by an external force.

The display apparatus 200 according to an exemplary embodiment may have difficulty withstanding the accumulated stress due to the repetitive bending operations since the substrate 210, the die 220, the stretchable film 230 and the bonding film 240 are in close-contact with one another. In particular, the accumulation of the stress may cause the substrate 210, the die 220 and the stretchable film 230 to be disconnected at their edge areas.

To solve such problems, which may arise in the structures shown in FIG. 4 and FIG. 5, at least one of the substrate 210, the die 220, the stretchable film 230 and the bonding film 240 may be modified as follows.

Figure 6:
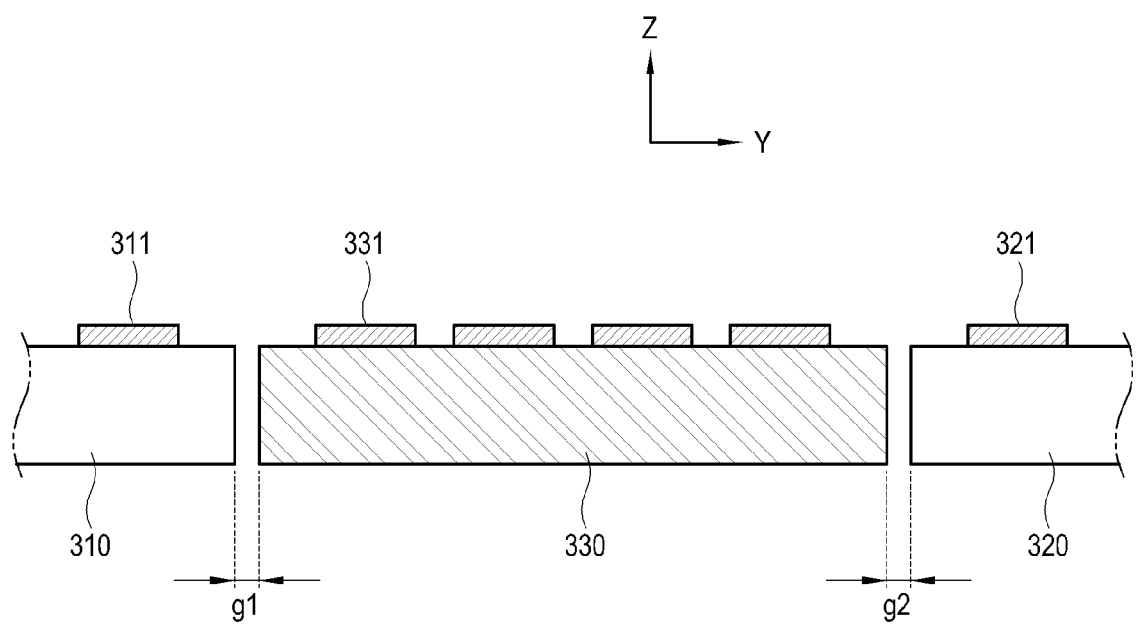
FIG. 6 is a partial cross-section view of showing a structure of the die and the substrate in the display apparatus according to an exemplary embodiment.

FIG. 6 is a partial cross-section view of showing a structure of a die 330 and substrates 310, 320 in the display apparatus according to an exemplary embodiment.

As shown in FIG. 6, according to this exemplary embodiment, the first substrate 310 and the second substrate 320, which are separated from each other along the Y direction axial line, are arranged in parallel, and the die 330 is placed in parallel a space between the first substrate 310 and the second substrate 320. The first substrate 310, the second substrate 320 and the die 330 include terminals 311, 321 and 331 for electric connection on their upper surfaces, respectively.

In comparison with the foregoing structure shown in FIG. 5, the structure of FIG. 6 is different as follows. In the structure shown in FIG. 5, the substrate 210 is provided as a single body, and the die 220 is stacked on the upper surface of the substrate 210, so that the upper surface of the substrate 210 can face the lower surface of the die 220.

On the other hand, in the structure of FIG. 6, the substrate is separated into two substrates 310 and 320, and the die 330 is arranged in parallel between two substrates 310 and 320. That is, the first substrate 310, the die 330 and the second substrate 320 are extended in one direction along the Y direction axial line. Thus, a gap g1 is formed between the first substrate 310 and the die 330, and a gap g2 is formed between the die 330 and the second substrate 320.

When the display apparatus with this structure is bent, the gaps g1 and g2 prevent stress from occurring between the die 330 and the substrates 310 and 320. If a bending curvature of the display apparatus exceeds an allowable range of the gaps g1 and g2, the substrates 310, 320 and the die 330 may contact each other. Therefore, the length of the gap g1, g2 should not be excessively small in consideration of the size of the display apparatus. Since the length of the gap g1, g2 is determined considering various environmental factors when the display apparatus is designed, its specific numerical value is not limited herein.

Figure 7:
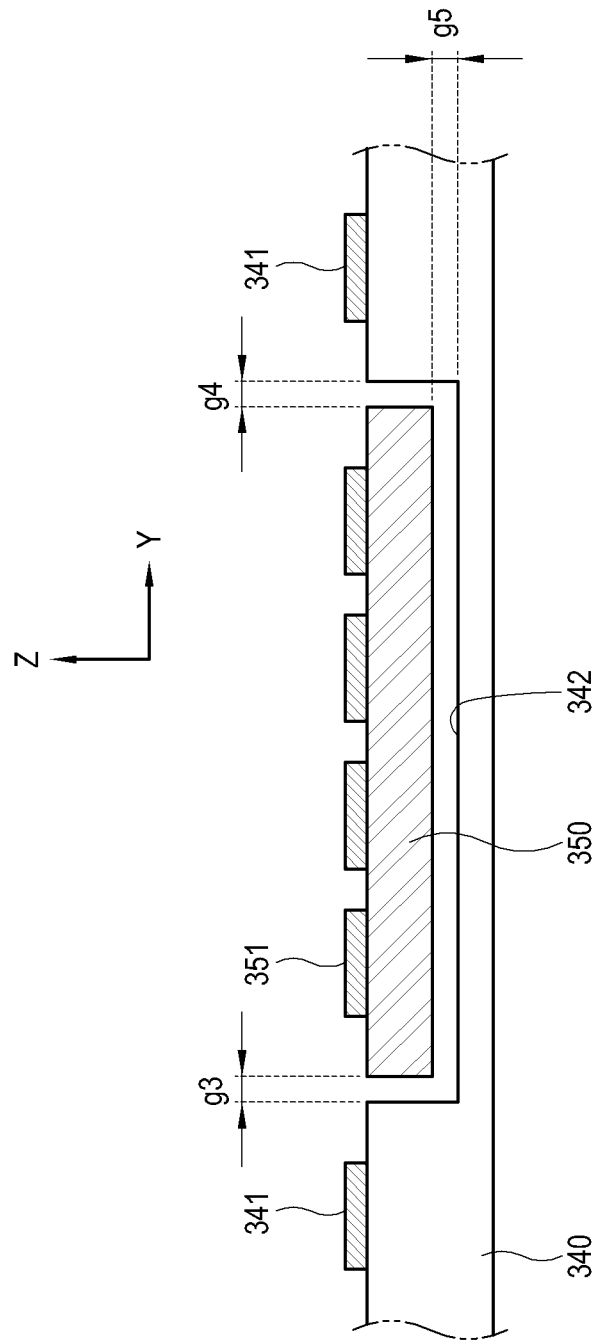
FIG. 7 is a partial cross-section view of showing a structure of the die and the substrate, which is different from that of FIG. 6, in the display apparatus according to an exemplary embodiment.

FIG. 7 is a partial cross-section view of showing a structure of a die 350 and a substrate 340, which is different from that of FIG. 6, in the display apparatus according to an exemplary embodiment.

As shown in FIG. 7, the substrate 340 in this embodiment has an accommodating space 342 concavely recessed from the upper surface, and the die 350 is accommodated in the accommodating space 342. Further, terminals 341 and 351 for electric connection are formed on the upper surfaces of the substrate 340 and the die 350.

In comparison with the foregoing structure shown in FIG. 5, the structure of FIG. 7 is different as follows. In the structure shown in FIG. 5, the substrate 210 is provided as a single body, and the die 220 is stacked on the upper surface of the substrate 210, so that the upper surface of the substrate 210 can face the lower surface of the die 220.

On the other hand, in the structure of FIG. 7, the die 350 is accommodated in the accommodating space 342 of the substrate 340. The accommodating space 342 is larger than the die 350 so that gaps g3, g4 and g5 can be formed between the substrate 340 and the die 350. The gap g3 formed between a lateral wall of the accommodating space 342 and a lateral side of the die 350, the gap g4 formed between a right wall of the accommodating space 342 and a right side of the die 350, and the gap g5 formed between a bottom wall of the accommodating space 342 and a lower surface of the die 350 are used to release the stress between the substrate 340 and the die 350 when the display apparatus with this structure is bent.

Since the lengths of the gaps g3, g4 and g5 are determined considering various environmental factors when the display apparatus is designed, their specific numerical values are not limited herein.

Figure 8:
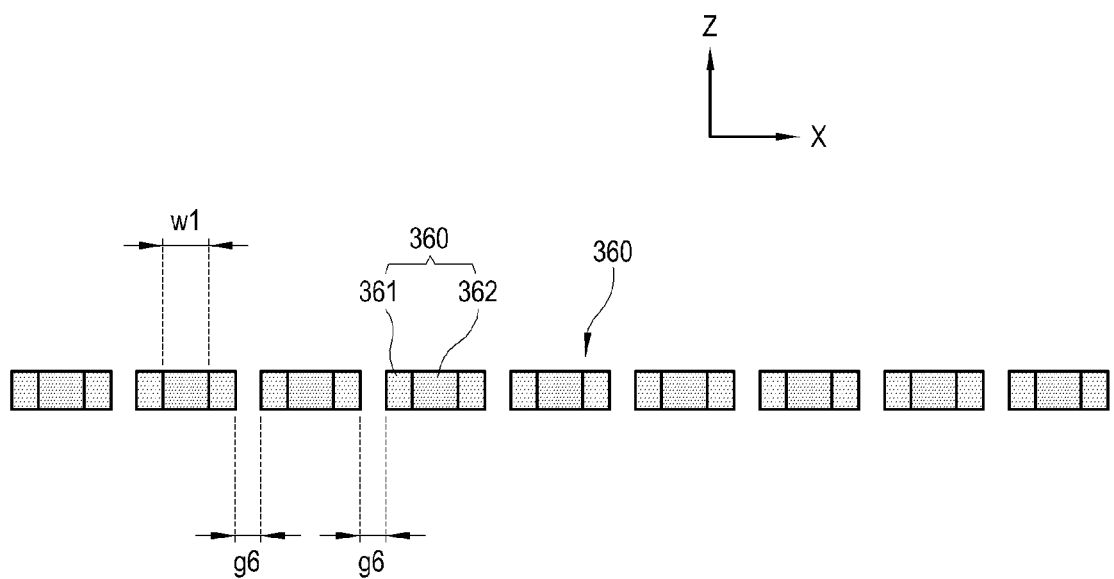
FIG. 8 is a partial cross-section view of showing a structure of a bonding film in the display apparatus according to an exemplary embodiment.

FIG. 8 is a partial cross-section view of showing a structure of a bonding film in the display apparatus according to an exemplary embodiment.

As shown in FIG. 8, the bonding film includes a plurality of unit films 360 where an electric conductor 362 is embedded in an adhesive resin 361. The plurality of unit films 360 are arranged in a row along the Y direction axial line, so that the stretchable film, the substrate and the die, which are extended along the Y direction, can be bonded to one another.

The bonding film shown in FIG. 8 is formed in such a manner that the bonding film 240 (see FIG. 5) is separated into a plurality of unit films each of which includes the electric conductor 241 (see FIG. 5). Further, a gap g6 is formed between the unit films 360, and provides a space for bending the display apparatus.

Here, the width w1 of the electric conductor 362 is larger by a predetermined value than that of each terminal 211, 221 and 231 (see FIG. 5) of the stretchable film 230 (see FIG. 5), and the die 220 (see FIG. 5) of the substrate 210 (see FIG. 5). This is to prevent disconnection due to movement of the electric conductor 362 when the display apparatus is bent.

Figure 9:
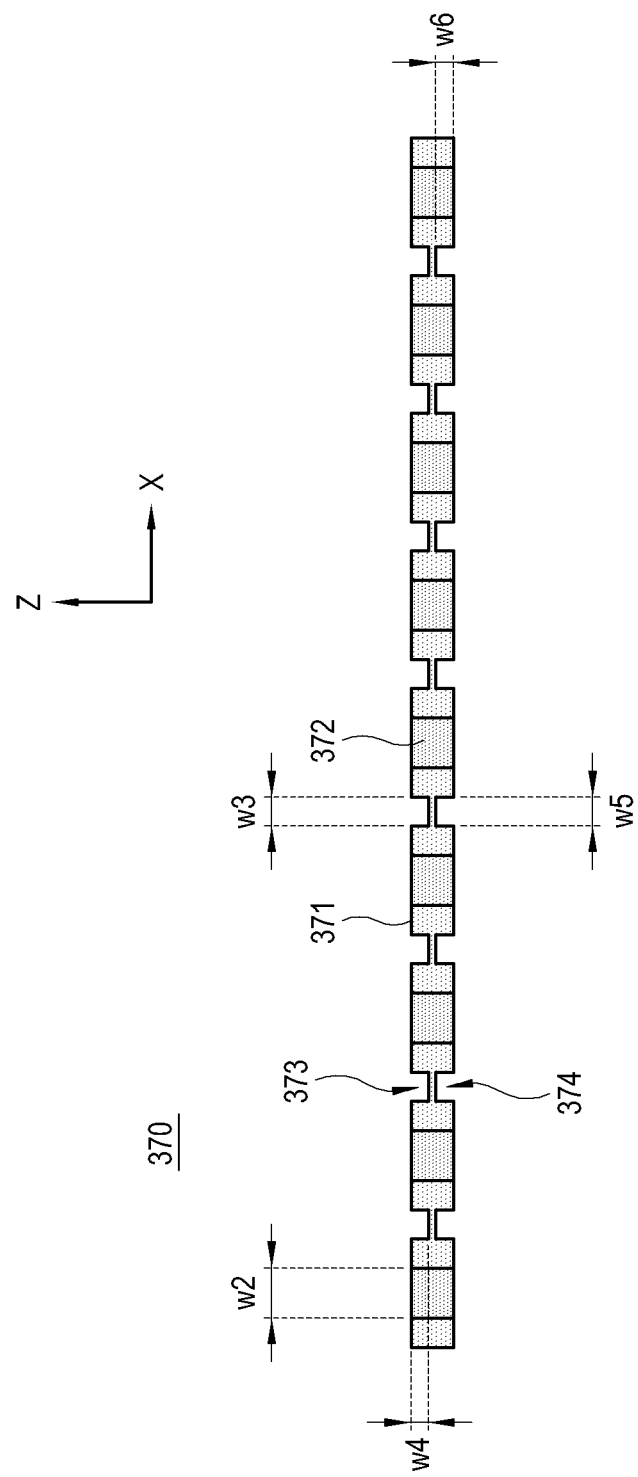
FIG. 9 is a partial cross-section view of showing a structure of the bonding film, which is different from that of FIG. 8, in the display apparatus according to an exemplary embodiment.

FIG. 9 is a partial cross-section view of showing a structure of a bonding film 370, which is different from that of FIG. 8, in the display apparatus according to an exemplary embodiment.

As shown in FIG. 9, the bonding film 370 is formed in such a manner that a plurality of cavities 373 and 374 are formed in an adhesive resin 371 between conductors 372 along the Y direction axial line in the bonding film 240 (see FIG. 5) shown in FIG. 5.

In FIG. 9, the cavities 373 and 374 are formed on and beneath the bonding film 370 so that an upper cavity 373 and a lower cavity 374 can be symmetrical to each other. However, this is one of the methods for forming the cavities 373 and 374 in the bonding film 370. Alternatively, there may be various methods of forming the cavities 373 and 374. For example, the bonding film 370 may have only one of the upper cavity 373 and the lower cavity 374. In addition, the upper cavity 373 and the lower cavity 374 may be formed not symmetrically but alternately.

The width w3 and the depth w4 of the upper cavity 373, and the width w5 and the depth w6 of the lower cavity 374 are not limited to certain numerical values. By the gaps formed by the upper cavities 373 and the lower cavities 374, a space for bending the display apparatus is provided. Thus, it is possible to release stress accumulated by repetitive bending operations FIG. 10 is a partial cross-section view of showing a structure, where substrates 380 and 390 and a die 400 are different from the structure of FIG. 6, in the display apparatus according to an exemplary embodiment.

Figure 10:
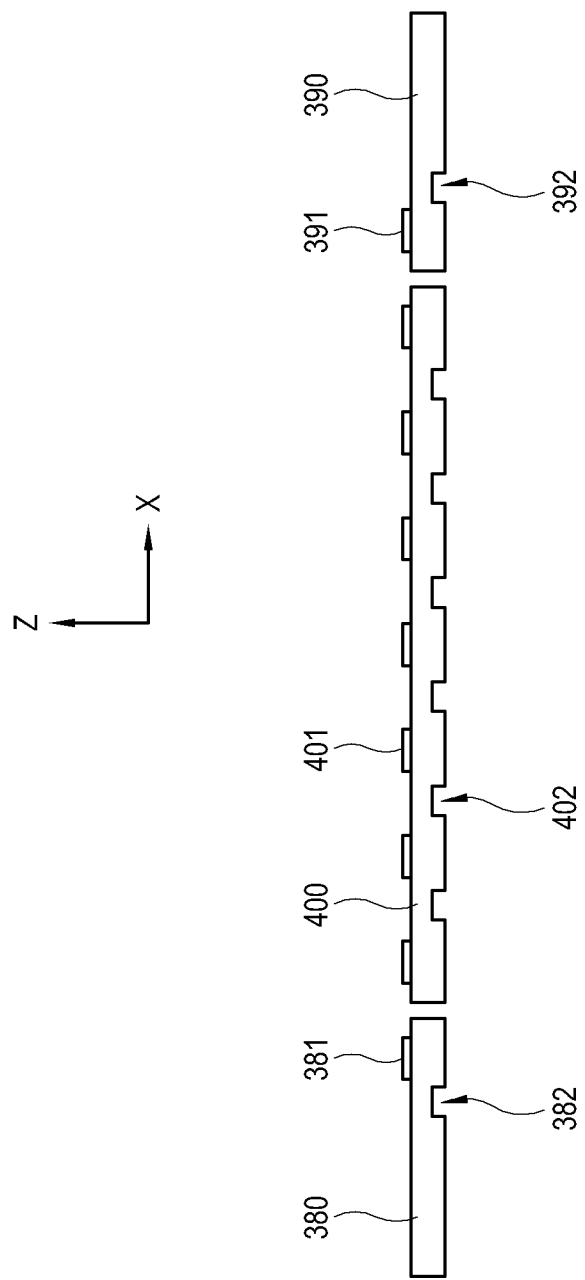
FIG. 10 is a partial cross-section view of showing a structure, where the substrate and the die are modified from the structure of FIG. 6, in the display apparatus according to an exemplary embodiment.

As shown in FIG. 10, the substrates 380 and 390 and the die 400 are formed in such a manner that cavities 382, 392 and 402 are additionally formed on the lower surface in the foregoing structure of FIG. 6. In FIG. 10, all the substrates 380 and 390 and the die 400 are respectively formed with the cavities 382, 392 and 402, but not limited thereto. Alternatively, the cavities 382, 392 and 402 may be provided in at least one of the substrates 380 and 390 and the die 400.

Further, the cavities 382, 392 and 402 may be respectively formed on not the lower surfaces of the substrates 380 and 390 and the die 400, but the upper surfaces of the substrates 380 and 390 and the die 400. However, a circuit structure such as the terminals 381, 391 and 401 may be formed on the upper surfaces of the substrates 380 and 390 and the die 400, and it is thus the cavities 382, 392 and 402 may be formed on the lower surfaces of the substrates 380 and 390 and the die 400 to thereby avoid interference with such a circuit structure.

In the structure according to this exemplary embodiment, there are not only gaps formed between the substrates 380 and 390 and the die 400, but also gaps due to the cavities 382, 392 and 402. These gaps provide a space for bending the display apparatus, thereby releasing the stress accumulated by the repetitive bending operations.

Figure 11:
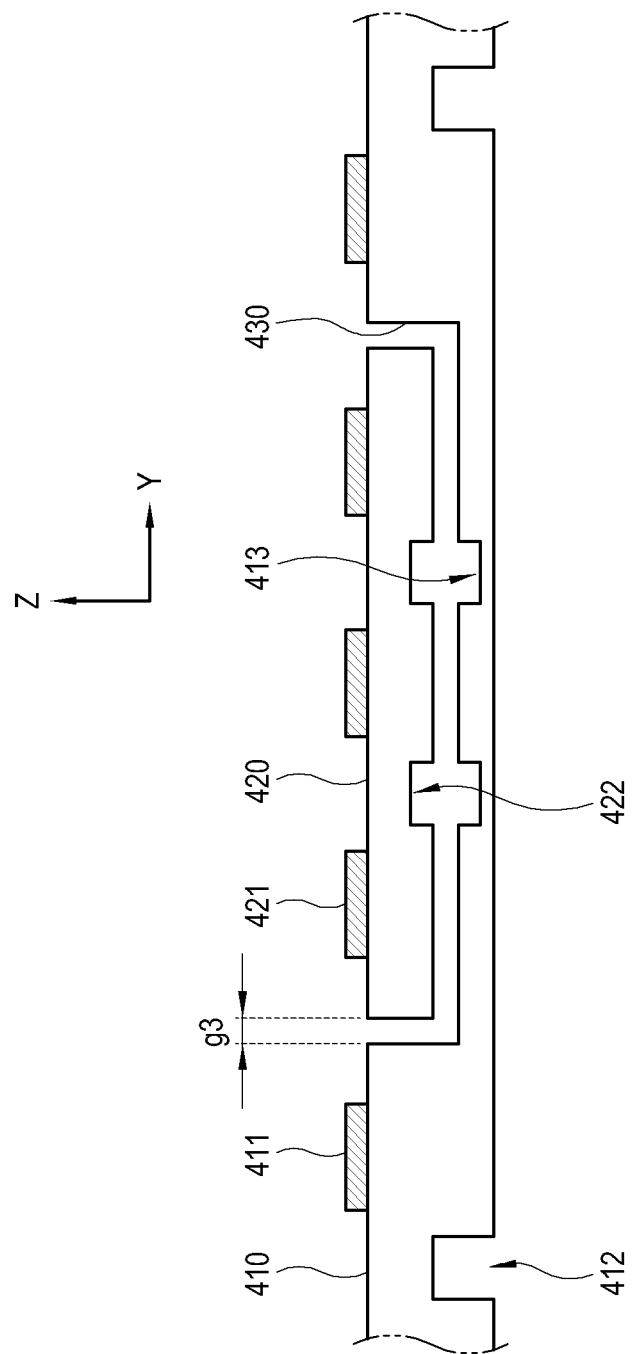
FIG. 11 is a partial cross-section view of showing a structure, where the substrate and the die are modified from the structure of FIG. 7, in the display apparatus according to an exemplary embodiment.

FIG. 11 is a partial cross-section view of showing a structure, where substrates 410 and a die 420 are different from the structure of FIG. 7, in the display apparatus according to an exemplary embodiment.

As shown in FIG. 11, the substrate 410 has an accommodating space 430 for accommodating the die 420 therein. This structure is similar to the foregoing structure of FIG. 7. In this exemplary embodiment, the structure of FIG. 7 is modified to respectively form the cavities 412, 413 and 422 on the lower surface of the substrate 410, the lower surface of the accommodating space 430 and the lower surface of the die 420.

FIG. 11 illustrates that the cavities 412, 413 and 422 are respectively formed on all the lower surface of the substrate 410, the lower surface of the accommodating space 430 and the lower surface of the die 420, but not limited thereto. Various modifications may be applied to this embodiment. Alternatively, the cavities 412, 413 and 422 may be formed in at least one among the lower surface of the substrate 410, the lower surface of the accommodating space 430, and the lower surface of the die 420. Further, the cavities 412, 413 and 422 are formed on the lower surface of the substrate 410, the lower surface of the accommodating space 430, the lower surface of the die 420, etc. without interfering with the circuit structure such as the terminals 411 and 421, but not limited thereto. Alternatively, the cavities may be respectively formed on each upper surface of the substrate 410 or the die 420.

In the structure according to this exemplary embodiment, the gaps are formed by the cavities 412, 413 and 422, and the gap is formed by the accommodating space 430. Such a gap provides a space where the display apparatus is bent, thereby releasing the stress accumulated by the repetitive bending operations.

Exemplary embodiments which are improved in the interconnection structure between the die and the substrate by combining the structures shown in FIG. 6 to FIG. 11 are described below.

FIG. 12 to FIG. 19 are lateral cross-section views of schematically illustrating variations of the interconnection structure between the substrate and the die in the display apparatus according to an exemplary embodiment.

Figure 12:
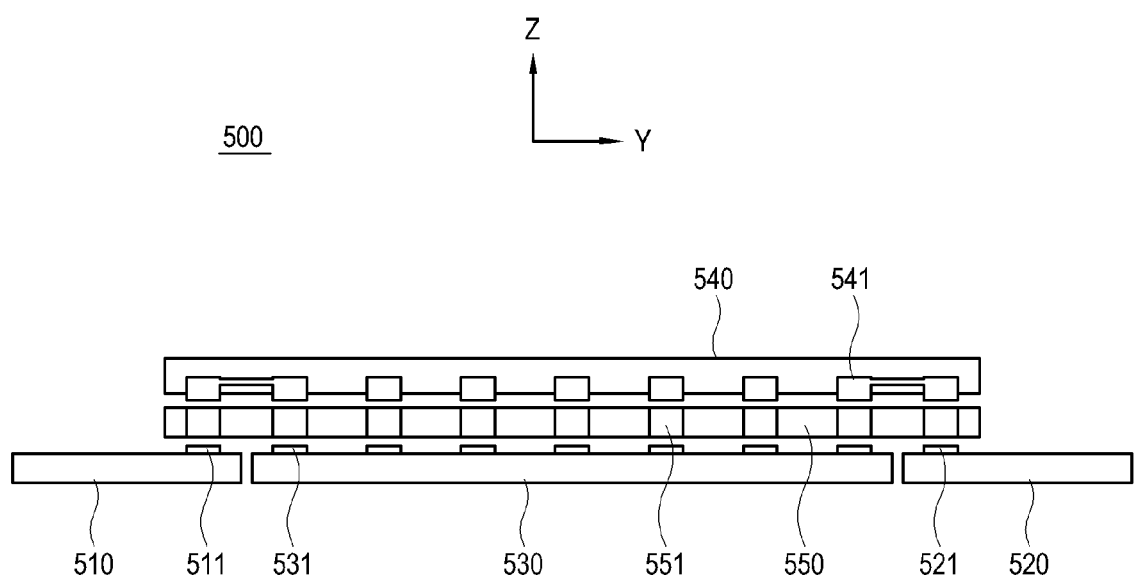
FIG. 12 to FIG. 19 are lateral cross-section views of schematically illustrating variations of the interconnection structure between the substrate and the die in the display apparatus according to an exemplary embodiment.

As shown in FIG. 12, a display apparatus 500 according to an exemplary embodiment includes a first substrate 510, a second substrate 520, a die 530, a stretchable film 540, and a bonding film 550. These elements are substantially the same as those of the foregoing exemplary embodiments, and thus repetitive descriptions thereof will be omitted.

A terminal 511 of the first substrate 510 and a terminal 521 of the second substrate 520 are electrically connected to a terminal 531 of the die 530 by an electric connector 551 of the bonding film 550 and a wiring line 541 of the stretchable film 540. Further, the first substrate 510, the second substrate 520 and the die 530 are coupled to the stretchable film 540 by the bonding film 550.

In this exemplary embodiment, the first substrate 510 and the second substrate 520 are spaced apart from each other along the Y direction axial line, and the die 530 is sandwiched between the first substrate 510 and the second substrate 520 along the Y direction axial line. The gaps are respectively formed between the first substrate 510 and the die 530 and between the second substrate 520 and the die 530. These gaps provide a space for bending the display apparatus, thereby releasing the stress accumulated by the repetitive bending operations.

Figure 13:
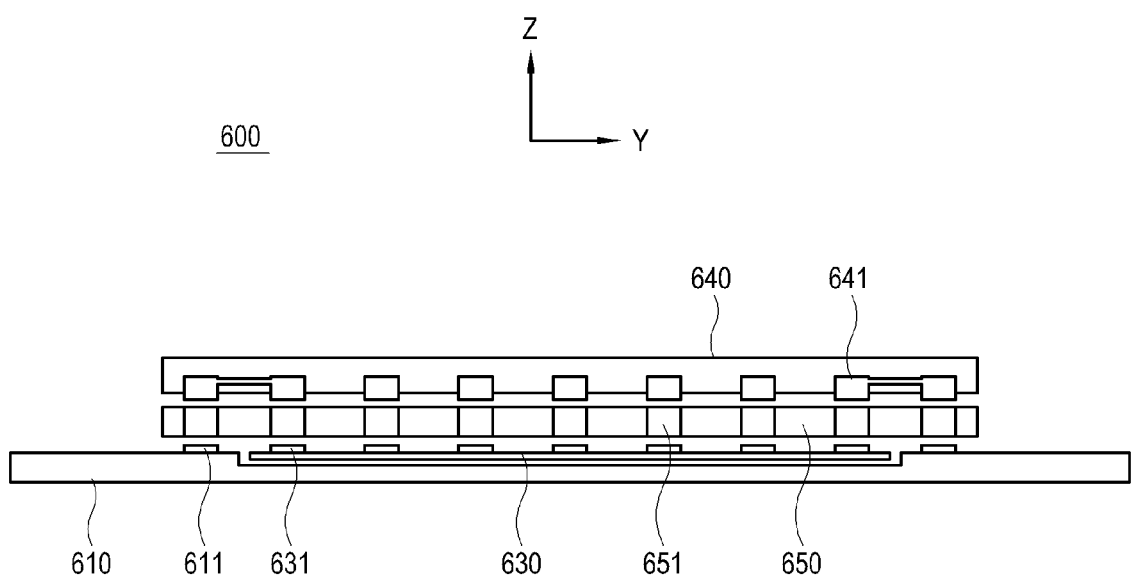

As shown in FIG. 13, a display apparatus 600 according to an exemplary embodiment includes a substrate 610, the die 630, a stretchable film 640 and a bonding film 650. These elements are the same as those of the foregoing exemplary embodiments, and thus repetitive descriptions thereof will be omitted.

A terminal 611 of the substrate 610 and an electric conductor of the bonding film 650 are electrically connected to a terminal 631 of the die 630 through the electric connector 651 and the wiring line 641 of the stretchable film 640. Further, the substrate 610 and the die 630 are coupled to the stretchable film 640 by the bonding film 650.

In this exemplary embodiment, an accommodating space 612 is concavely recessed in the upper surface of the substrate 610, and the die 630 is accommodated in the accommodating space 612. Since the substrate 610 and the die 630 are coupled by the bonding film 650 and the stretchable film 640, there are no elements for coupling the substrate 610 and the die 630 in the accommodating space 612, and gaps are formed between the substrate 610 and the die 630 in the accommodating space 612. These gaps provide a space for bending the display apparatus, thereby releasing the stress accumulated by the repetitive bending operations.

Figure 14:
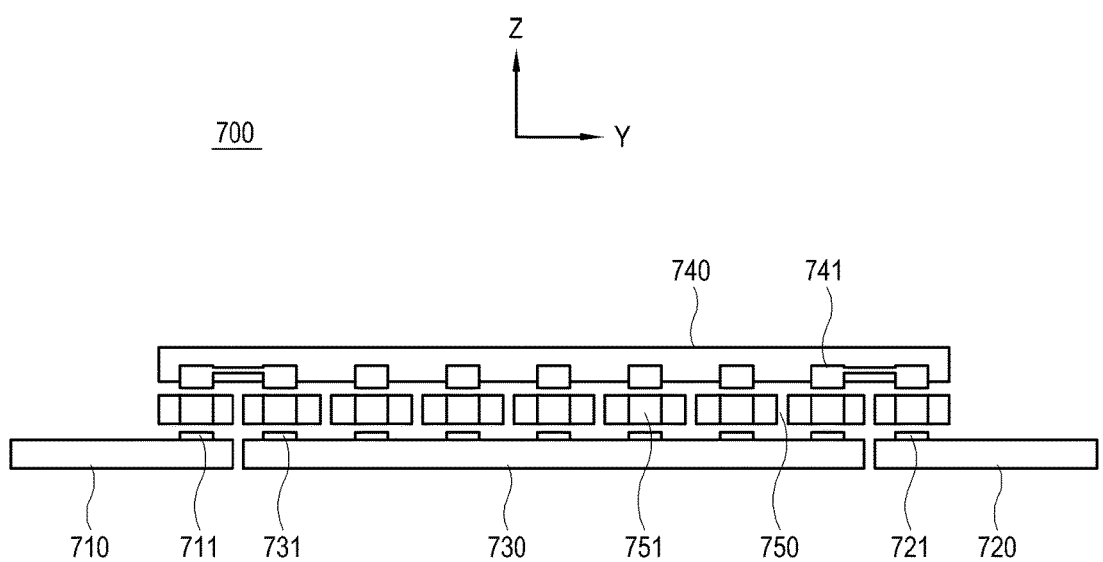

As shown in FIG. 14, a display apparatus 700 according to an exemplary embodiment includes a first substrate 710, a second substrate 720, a die 730, a stretchable film 740, and a bonding film 750. These elements are the same as those of the foregoing exemplary embodiments, and thus repetitive descriptions thereof will be avoided as necessary.

A terminal 711 of the first substrate 710 and a terminal 721 of the second substrate 720 electrically connected to a terminal 731 of the die 730 through an electric conductor 751 of the bonding film 750 and a wiring line 741 of the stretchable film 740. Further, the first substrate 710, the second substrate 720 and the die 730 are coupled to the stretchable film 740 by the bonding film 750.

In this exemplary embodiment, the first substrate 710 and the second substrate 720 are spaced apart from each other along the Y direction axial line, and the die 730 is arranged between the first substrate 710 and the second substrate 720 along the Y direction axial line. As the bonding films 750, a plurality of unit films, in which the electric conductor 751 are respectively embedded, are arranged along the Y direction axial line.

Gaps are respectively formed between the first substrate 710 and the die 730, between the second substrate 720 and the die 730, and between the bonding films 750. These gaps provide a space for bending the display apparatus, thereby releasing the stress accumulated by the repetitive bending operations.

Figure 15:
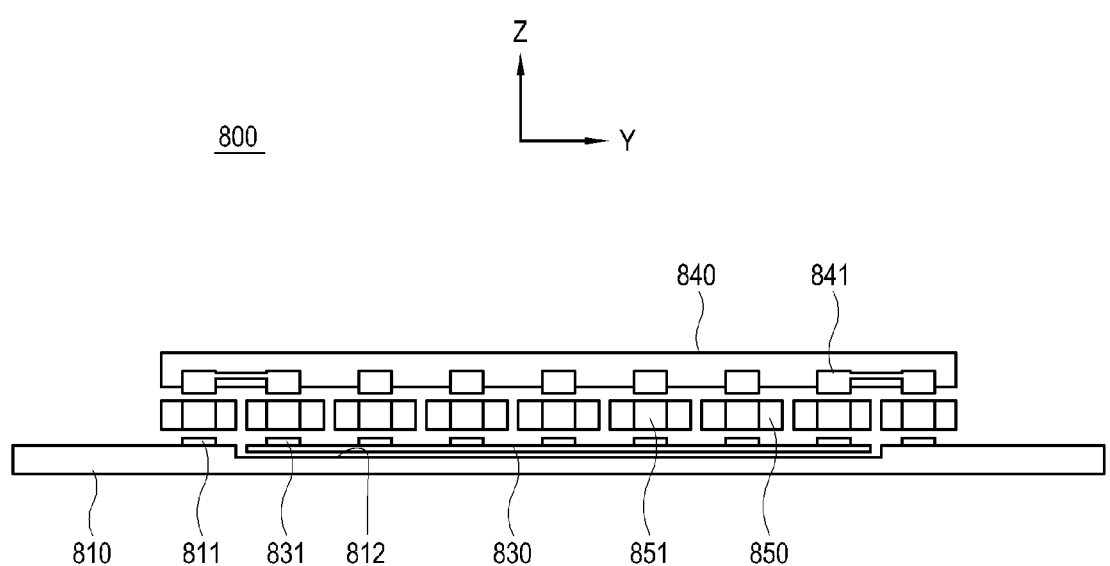

As shown in FIG. 15, a display apparatus 800 according to an exemplary embodiment includes a substrate 810, a die 830, a stretchable film 840, and a bonding film 850. These elements are the same as those of the foregoing exemplary embodiments, and thus repetitive descriptions thereof will be omitted.

A terminal 811 of the substrate 810 is electrically connected to a terminal 831 of the die 830 through an electric conductor 851 of the bonding film 850 and a wiring line 841 of the stretchable film 840. Further, the substrate 810 and the die 830 are coupled to the stretchable film 840 by the bonding film 850.

In this exemplary embodiment, an accommodating space 812 is concavely recessed in the upper surface of the substrate 810, and the die 830 is accommodated in the accommodating space 812. Since the substrate 810 and the die 830 are coupled by the bonding film 850 and the stretchable film 840, there are no elements for coupling the substrate 810 and the die 830 in the accommodating space 812 and gaps are formed between the substrate 810 and the die 830 in the accommodating space 812.

Further, as the bonding films 850, a plurality of unit films, in which the electric conductors 851 are respectively embedded, are arranged along the Y direction axial line, and gaps are formed between the respective bonding films 850.

These gaps provide a space for bending the display apparatus, thereby releasing the stress accumulated by the repetitive bending operations.

Figure 16:
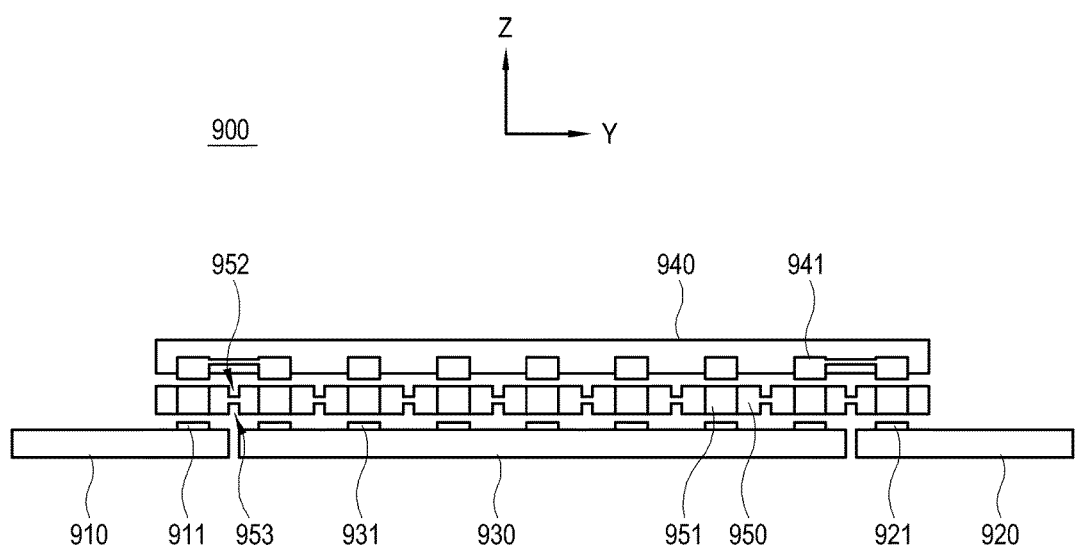

As shown in FIG. 16, a display apparatus 900 according to an exemplary embodiment includes a first substrate 910, a second substrate 920, a die 930, a stretchable film 940, and a bonding film 950. These elements are the same as those of the foregoing exemplary embodiments, and thus repetitive descriptions thereof will be omitted.

A terminal 911 of the first substrate 910 and a terminal 921 of the second substrate 920 are electrically connected to a terminal 931 of the die 930 through an electric conductor 951 of the bonding film 950 and a wiring line 941 of the stretchable film 940. Further, the first substrate 910, the second substrate 920 and the die 930 are coupled to the stretchable film 940 by the bonding film 950.

In this exemplary embodiment, the first substrate 910 and the second substrate 920 are spaced apart from each other along the Y direction axial line, and the die 930 is arranged between the first substrate 910 and the second substrate 920 along the Y direction axial line. Further, the bonding film 950 includes a plurality of cavities 952 and 953 formed between the electric conductors 951 and arranged along Y direction axial line.

Gaps are respectively formed between the first substrate 910 and the die 930, between the second substrate 920 and the die 930, and between the respective cavities 952 and 953. These gaps provide a space for bending the display apparatus, thereby releasing the stress accumulated by the repetitive bending operations.

Figure 17:
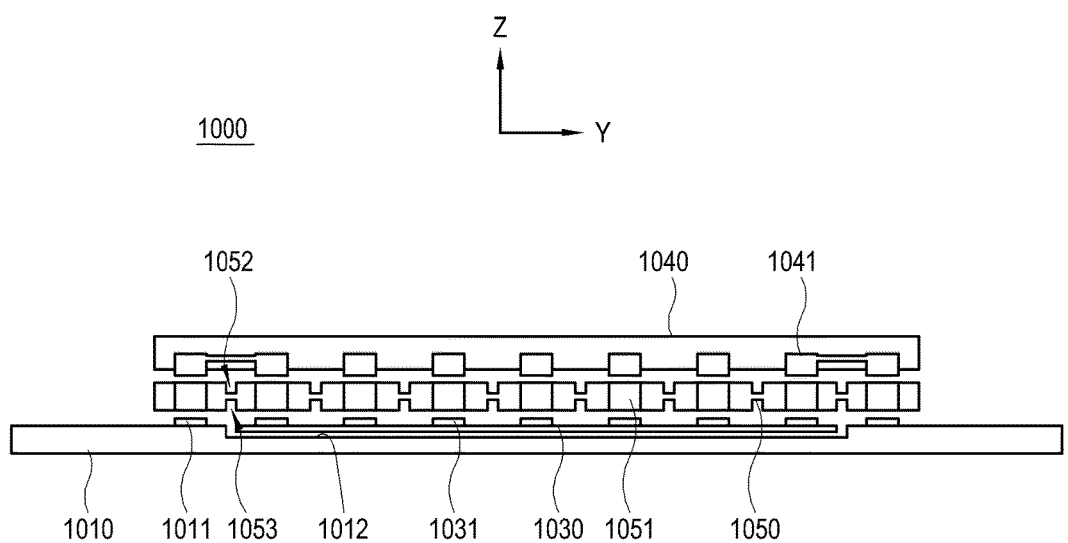

As shown in FIG. 17, a display apparatus 1000 according to an exemplary embodiment includes a substrate 1010, a die 1030, a stretchable film 1040, and a bonding film 1050. These elements are the same as those of the foregoing exemplary embodiments, and thus repetitive descriptions thereof will be omitted.

A terminal 1011 of the substrate 1010 is electrically connected to a terminal 1031 of the die 1030 through an electric conductor 1051 of the bonding film 1050 and a wiring line 1041 of the stretchable film 1040. Further, the substrate 1010 and the die 1030 are coupled to the stretchable film 1040 by the bonding film 1050.

In this exemplary embodiment, an accommodating space 1012 is concavely recessed in the upper surface of the substrate 1010, and the die 1030 is accommodated in the accommodating space 1012. Since the substrate 1010 and the die 1030 are coupled by the bonding film 1050 and the stretchable film 1040, there are no elements for coupling the substrate 1010 and the die 1030 in the accommodating space 1012 and gaps are formed between the substrate 1010 and the die 1030 in the accommodating space 1012.

Further, the bonding films 1050 include a plurality of cavities 1052 and 1053 formed between the respective electric conductors 1051 and arranged along the Y direction axial line, and gaps are formed in respective cavities 1052, 1053.

These gaps provide a space for bending the display apparatus, thereby releasing the stress accumulated by the repetitive bending operations.

Figure 18:
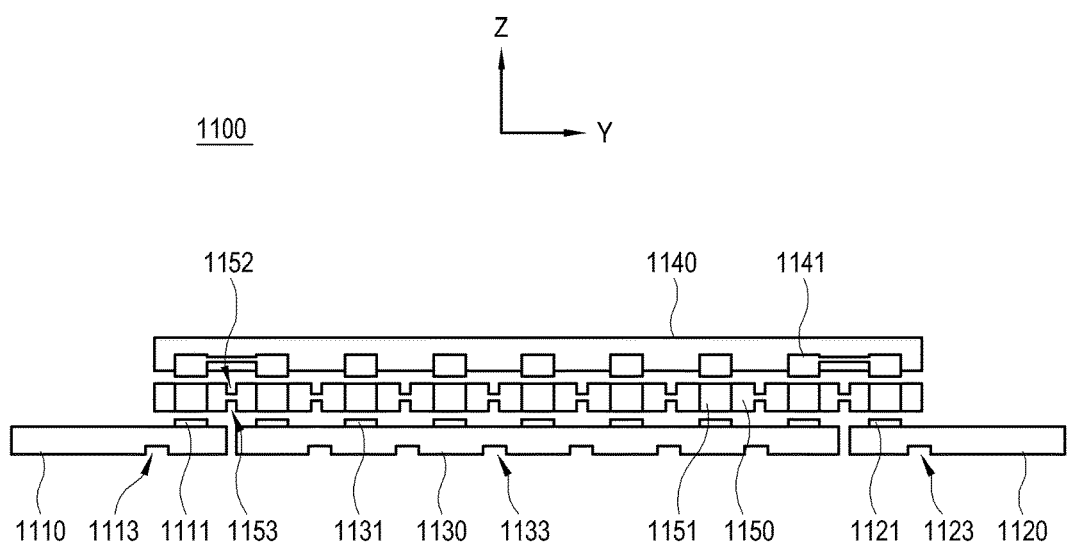

As shown in FIG. 18, a display apparatus 1100 according to an exemplary embodiment includes a substrate 1110, a die 1130, a stretchable film 1140, and a bonding film 1150.

These elements are the same as those of the foregoing exemplary embodiments, and thus repetitive descriptions thereof will be omitted.

An terminal 1111 of the substrate 1110 and an electric conductor 1151 of the bonding film 1150 are electrically connected to a terminal 1131 of the die 1130 through the wiring line 1141 of the stretchable film 1140. Further, the substrate 1110 and the die 1130 are coupled to the stretchable film 1140 by the bonding film 1150.

In this exemplary embodiment, one or more cavities 1113, 1123 and 1133, which are arranged along the Y direction axial line, are provided on the lower surfaces of the first substrate 1110, the second substrate 1120 and the die 1130. Further, the bonding film 1050 includes a plurality of cavities 1152 and 1153 which are formed between the electric conductors 1051 and arranged along the Y direction axial line. The cavities 1113, 1123, 1133, 1152 and 1153 make gaps.

These gaps provide a space for bending the display apparatus, thereby releasing the stress accumulated by the repetitive bending operations.

Figure 19:
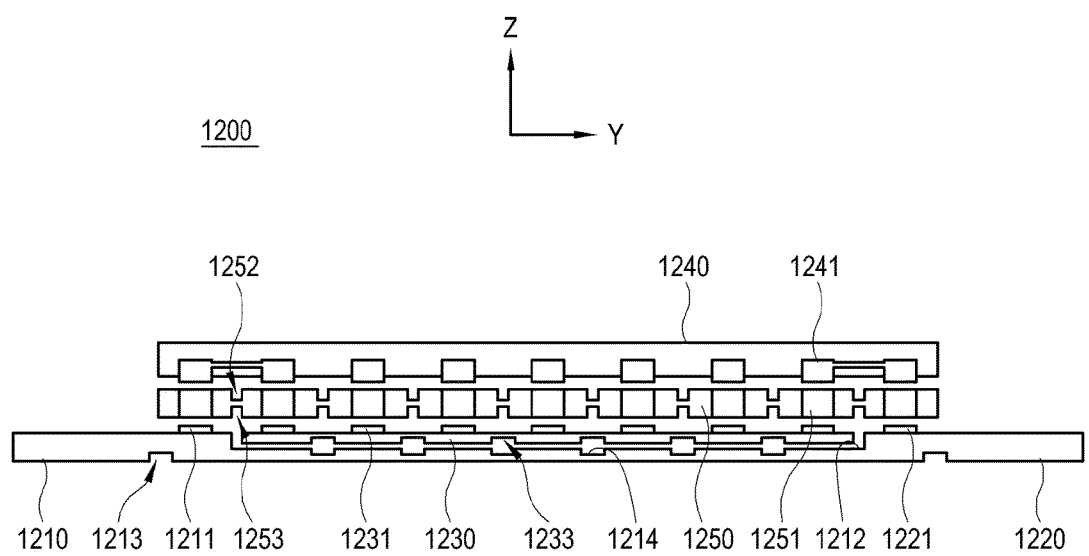

As shown in FIG. 19, a display apparatus 1200 according to an exemplary embodiment includes a substrate 1210, a die 1230, a stretchable film 1240, and a bonding film 1250. These elements are the same as those of the foregoing exemplary embodiments, and thus repetitive descriptions thereof will be omitted.

A terminal 1211 of the substrate 1210 is electrically connected to a terminal 1231 of the die 1230 through an electric conductor 1251 of the bonding film 1250 and a wiring line 1241 of the stretchable film 1240. Further, the substrate 1210 and the die 1230 are coupled to the stretchable film 1240 by the bonding film 1250.

In this exemplary embodiment, an accommodating space 1212 is concavely recessed in the upper surface of the substrate 1210, and the die 1230 is accommodated in the accommodating space 1212. Since the substrate 1210 and the die 1230 are coupled by the bonding film 1250 and the stretchable film 1240, there are no elements for coupling the substrate 1210 and the die 1230 in the accommodating space 1212 and gaps are formed between the substrate 1210 and the die 1230 in the accommodating space 1212.

Further, one or more cavities 1213 and 1214 are respectively provided on the lower surface of the substrate 1210 and the lower surface of the accommodating space 1212 along the Y direction axial line. Further still, the bonding film 1250 includes a plurality of cavities 1252 and 1253 respectively formed between the electric conductors 1251 and arranged along the Y direction axial line. Thus, the cavities 1213, 1214, 1252 and 1253 make gaps.

By these gaps, a space for bending the display apparatus is provided, thereby releasing the stress accumulated by the repetitive bending operations.

The foregoing exemplary embodiments are applied to the whole of the display apparatus, so that the display apparatus can be freely bent as desired by a user.

Alternatively, the foregoing exemplary embodiments may be applied to not the whole but a part of the display apparatus, so that the display apparatus can be bent in a certain area but cannot be bent in another area.

Figure 20:
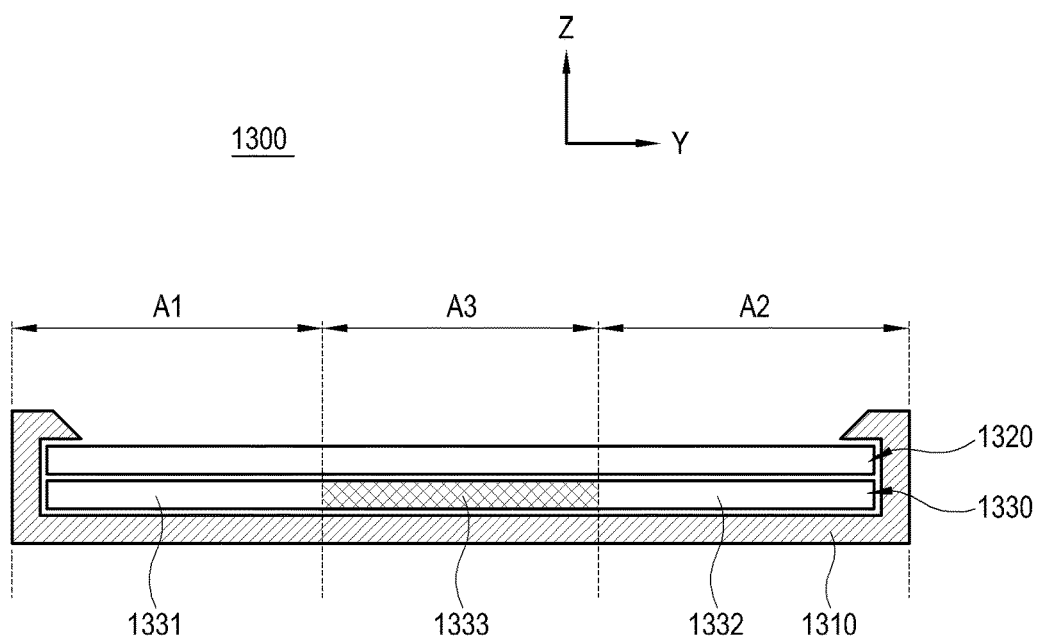
FIG. 20 is a lateral cross-section view of showing a principle that the flexible structure is applied to only a part of an image processing board in the display apparatus according to an exemplary embodiment.

FIG. 20 is a lateral cross-section view of showing a principle that the flexible structure is applied to only a part of an image processing board 1330 in a display apparatus 1300 according to an exemplary embodiment.

As shown in FIG. 20, the display apparatus 1300 according to an exemplary embodiment includes a housing 1310, a display panel 1320 for displaying an image, and an image processing board 1330 for processing a video signal to be displayed as an image on the display panel 1320.

The housing 1310 and the display panel 1320 have the flexible structure. However, the image processing board 1330 is divided into a rigid PBA 1331, 1332 and a flexible PBA 1333. That is, the bending is impossible in areas A1, A2 corresponding to the rigid PBA 1331, 1332, but the bending is possible in an area A3 corresponding to the flexible PBA 1333. Such a structure may be implemented if it is difficult to apply the flexible structure to the whole of the display apparatus 1300 or if the bending is needed in only a certain area A3. In this exemplary embodiment, the display apparatus 1300 can be folded up since a middle area of the display apparatus 1300 is bendable.

The structure of the flexible PBA 1333 may be variously designed. For example, the flexible PBA 1333 may have a structure according to the foregoing embodiments shown in FIG. 5 to FIG. 19.

In accordance with the foregoing exemplary embodiment, it is possible to achieve the display apparatus having the flexible structure that can be bent as desired by a user.

A display apparatus having the flexible structure may have problems as follows.

Figure 21:
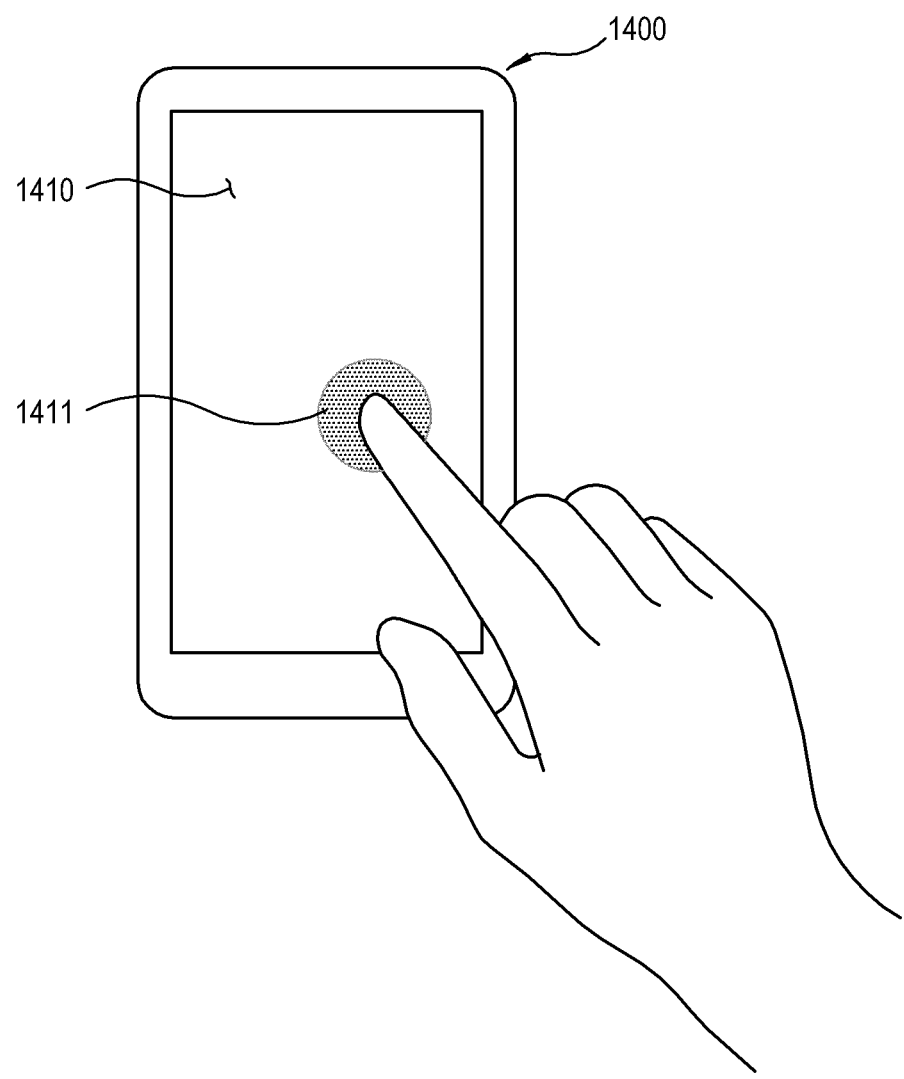
FIG. 21 illustrates that the display panel is touched in the display apparatus having the flexible structure according to an exemplary embodiment.

FIG. 21 illustrates that a display panel is touched in a display apparatus 1400 having the flexible structure according to an exemplary embodiment.

As shown in FIG. 21, the display apparatus 1400 according to an exemplary embodiment is achieved by a mobile apparatus in which a touch screen is applied to a display panel 1410. When a user touches a surface of the display panel 1410, interaction with the display apparatus 1400 is performed.

To make the display apparatus 1400 have the flexible structure according to the foregoing exemplary embodiments, elements, which constitute the display apparatus 1400, are also required to have the flexible structure. If a user touches the display panel 1410 for operations, the touched area 1411 is pressed and recessed inward, and an image in the corresponding area 1411 is contorted and distorted.

To prevent this, a structure for supporting the back of the display panel 1410 is applied to the display apparatus 1400 under the condition that the display apparatus 1400 is bendable. This structure will be described below.

Figure 22:
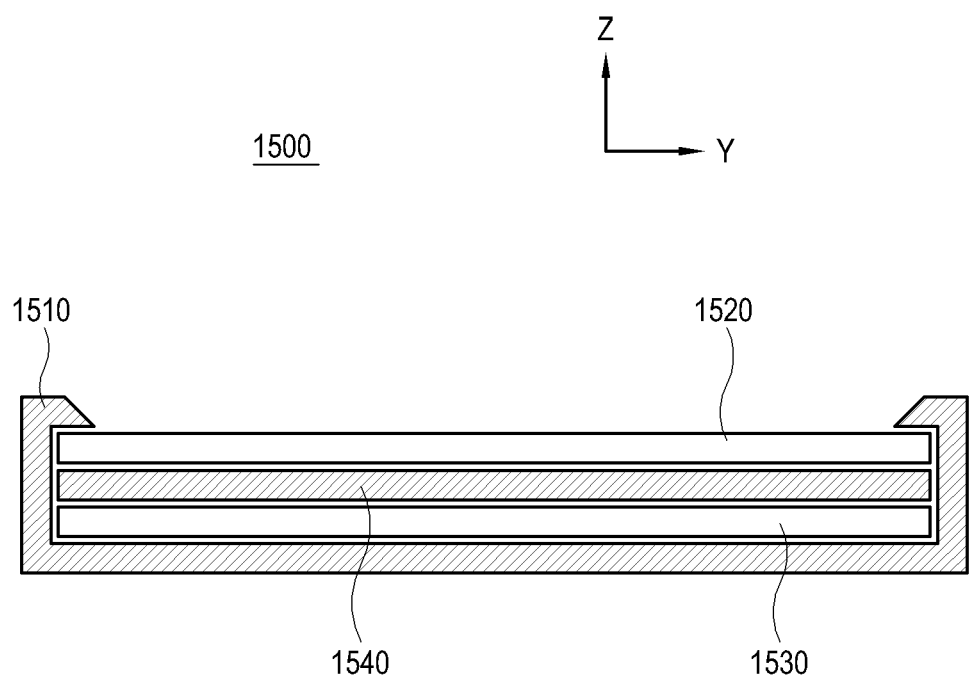
FIG. 22 is a lateral cross-section view of schematically illustrating the internal structure of the display apparatus according to an exemplary embodiment, for minimizing the phenomenon shown in FIG. 21.

FIG. 22 is a lateral cross-section view of schematically illustrating an internal structure of a display apparatus 1500 according to an exemplary embodiment, for minimizing the phenomenon shown in FIG. 21.

As shown in FIG. 22, the display apparatus 1500 according to an exemplary embodiment includes a housing 1510, a display panel 1520, an image processing board 1530, and a panel support member 1540 interposed between the display panel 1520 and the image processing board 1530. The housing 1510, the display panel 1520 and the image processing board 1530 are bendable since they have the flexible structure.

The panel support member 1540 is placed behind or beneath the display panel 1520 and supports the display panel 1520. When a user touches the upper surface of the display panel 1520 in front of or on the display panel 1520, the panel support member 1540 prevents a touched area of the display panel 1520 from being recessed in the −Z direction. Further, the panel support member 1540 has the flexible structure so that the display apparatus 1500 can be bent in the Z direction or the −Z direction.

Below, detailed structures of the panel support member 1540 will be described.

Figure 23:
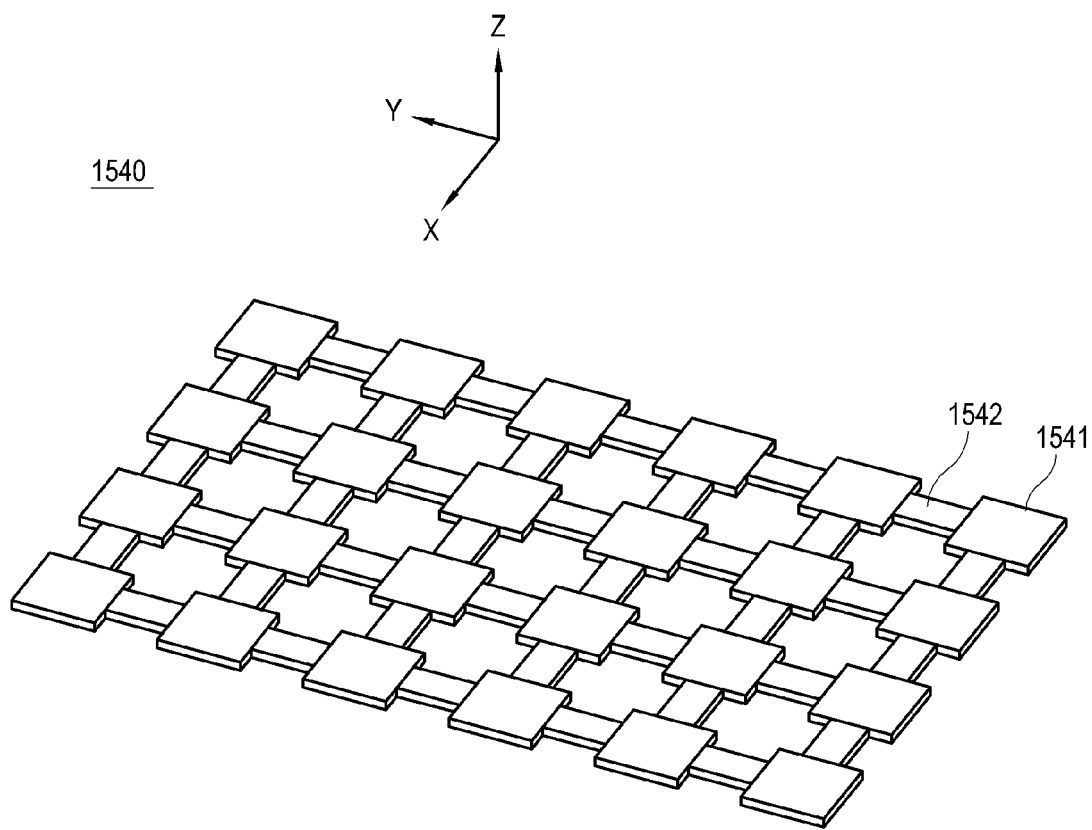
FIG. 23 is a perspective view of showing a structure of a panel support member applied to the display apparatus according to an exemplary embodiment.

FIG. 23 is a perspective view of showing a structure of the panel support member 1540 applied to the display apparatus according to an exemplary embodiment.

As shown in FIG. 23, the panel support member 1540 includes a plurality of plates 1541, and electrically transformable members 1542 connected between the plates 1541.

The electrically transformable members 1542 may be artificial muscles and will be referred to as artificial muscles herein. Artificial muscles are materials that can reversibly contract, expand, or rotate within one component due to an external stimulus, such as voltage or current. These actuation responses of contraction, expansion, and rotation can be combined together within a single component to produce other types of motions, e.g., bending, by contracting one side of the material while expanding the other side. For example, the artificial muscles may be electroactive polymers, such as piezoelectric polymers, dielectric actuators (DEAs), electrostrictive graft elastomers, liquid crystal elastomers (LCE) or ferroelectric polymers, that can be actuated through the application of electric fields.

The respective plates 1541 are arranged parallel along the X direction axial line and the Y direction axial line. In particular, the plurality of plates 1541 are arranged in the form of a matrix on the X-Y plane. In FIG. 23, the plate 1541 has a rectangular shape, but not limited thereto. Alternatively, the plate 1541 may have various shaped such as a circle, polygon, etc.

The plate 1541 includes a rigid material in order to support the display panel at the back thereof. There is no limit to a material of the plate 1541, but a sold material such as SUS may be used for the plate 1541.

The artificial muscle 1542 connects two plates 1541 adjacent to each other in the X direction and the Y direction. Unlike the plate 1541, the artificial muscle 1542 may be flexibly bent by an external force applied by a user. However, the artificial muscle 1542 may be transformed from an initial state when voltage is applied thereto. Thus, the artificial muscle 1542 is also called an electric responsive intelligent substance.

The artificial muscle 1542 may exhibit many voltage responsivities in accordance with how it is manufactured. For example, the artificial muscle 1542 has a flexible structure in the state that no voltage is applied thereto, but has a rigid structure when voltage is applied thereto. Further, the state of the artificial muscle 1542 may be varied depending on to applied voltage levels. In addition, the state of the artificial muscle 1542 may be changed as time passes. Similarly, there may be more alternative embodiments for implementing the voltage responsivities of the artificial muscle 1542, and thus detailed descriptions will be omitted.

In this exemplary embodiment, the artificial muscle 1542 is freely changeable in shape by an external force in the state that voltage is not supplied, but maintains the current changed state in the state that voltage is applied thereto. Thus, by applying a voltage to the artificial muscle 1542, it is possible to maintain the shape of the artificial muscle 1542 as changed by a user.

There may be a single or at least two artificial muscles 1542 for connecting two adjacent plates 1541. Below, it will be described that two adjacent plates 1541 are connected by two or more artificial muscles 1542 arranged in parallel with each other.

Figure 24:
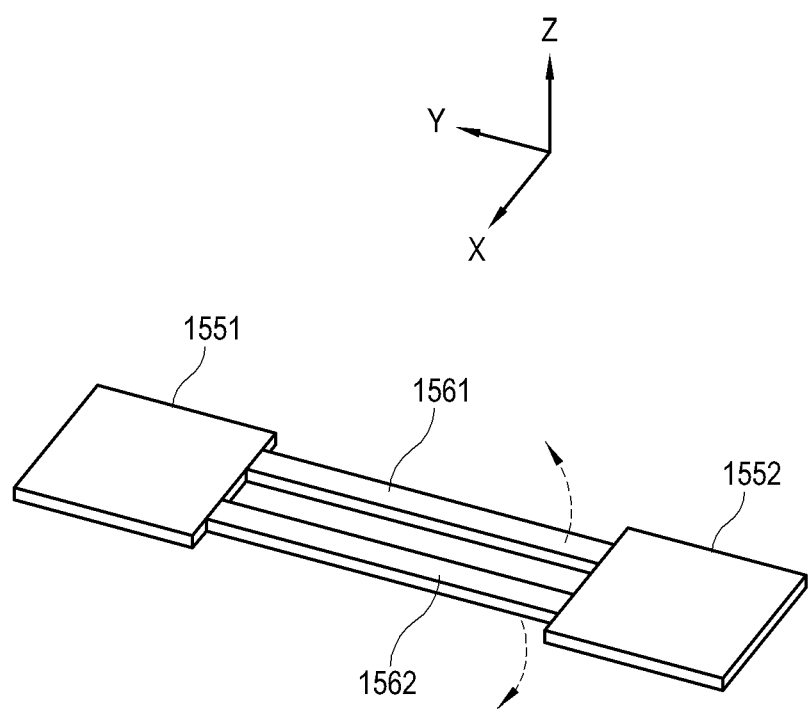
FIG. 24 and FIG. 25 illustrate types of an artificial muscle for connection between two plates in the panel support member applied to the display apparatus according to an exemplary embodiment.
Figure 25:
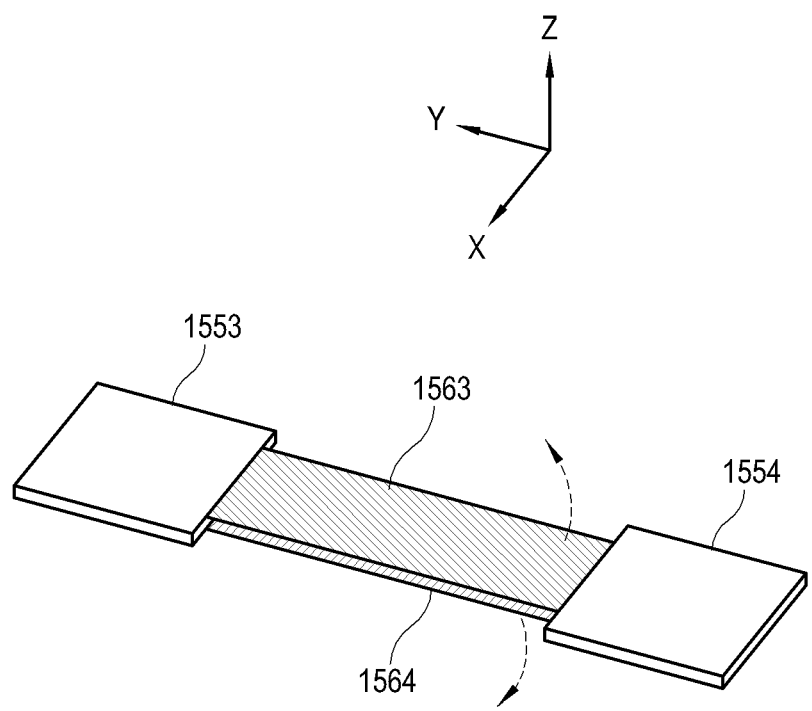
Figure 26:
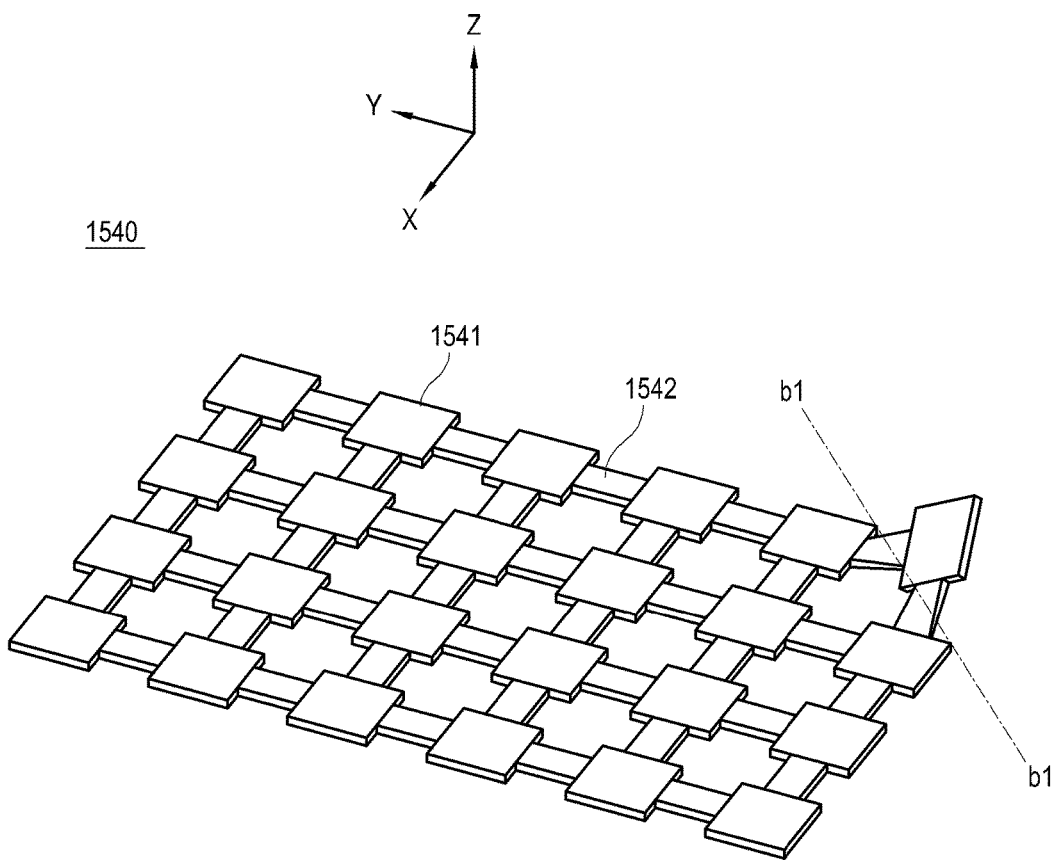
FIG. 26 to FIG. 30 are perspective views of showing various shapes of the panel support member applied to the display apparatus according to an exemplary embodiment, which is transformed by an external force.
Figure 27:
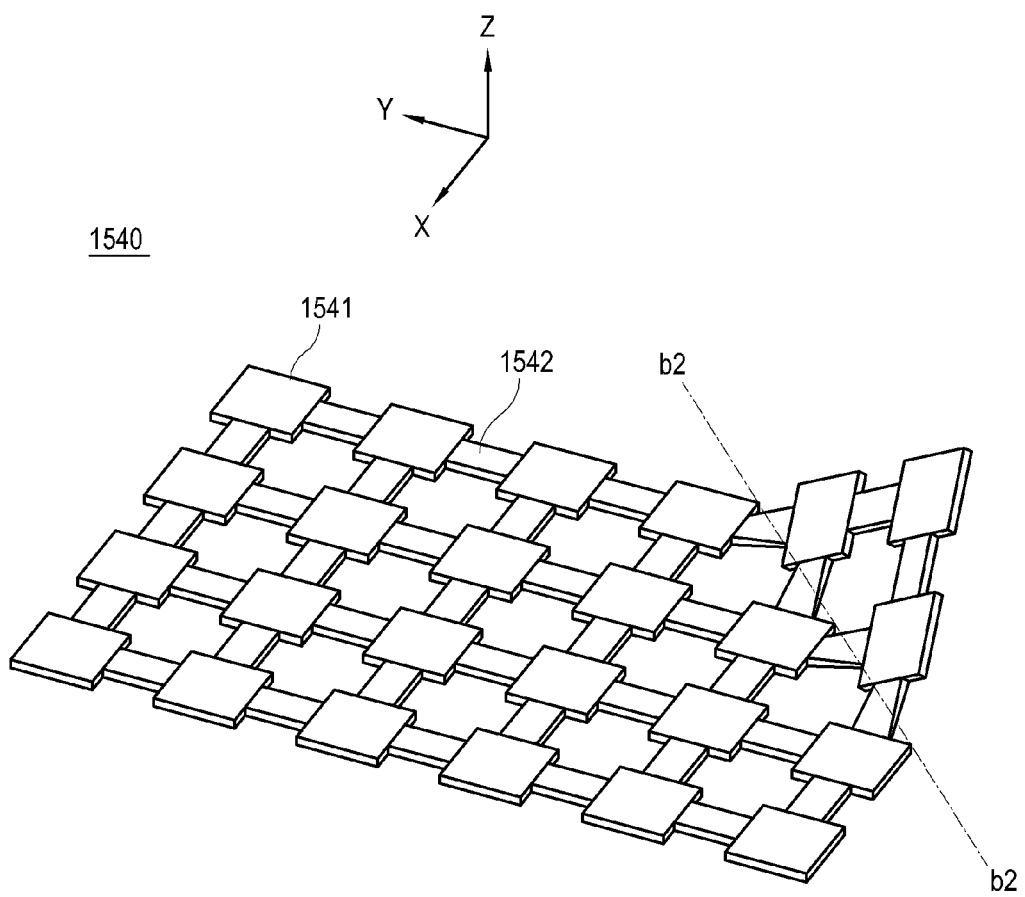
Figure 28:
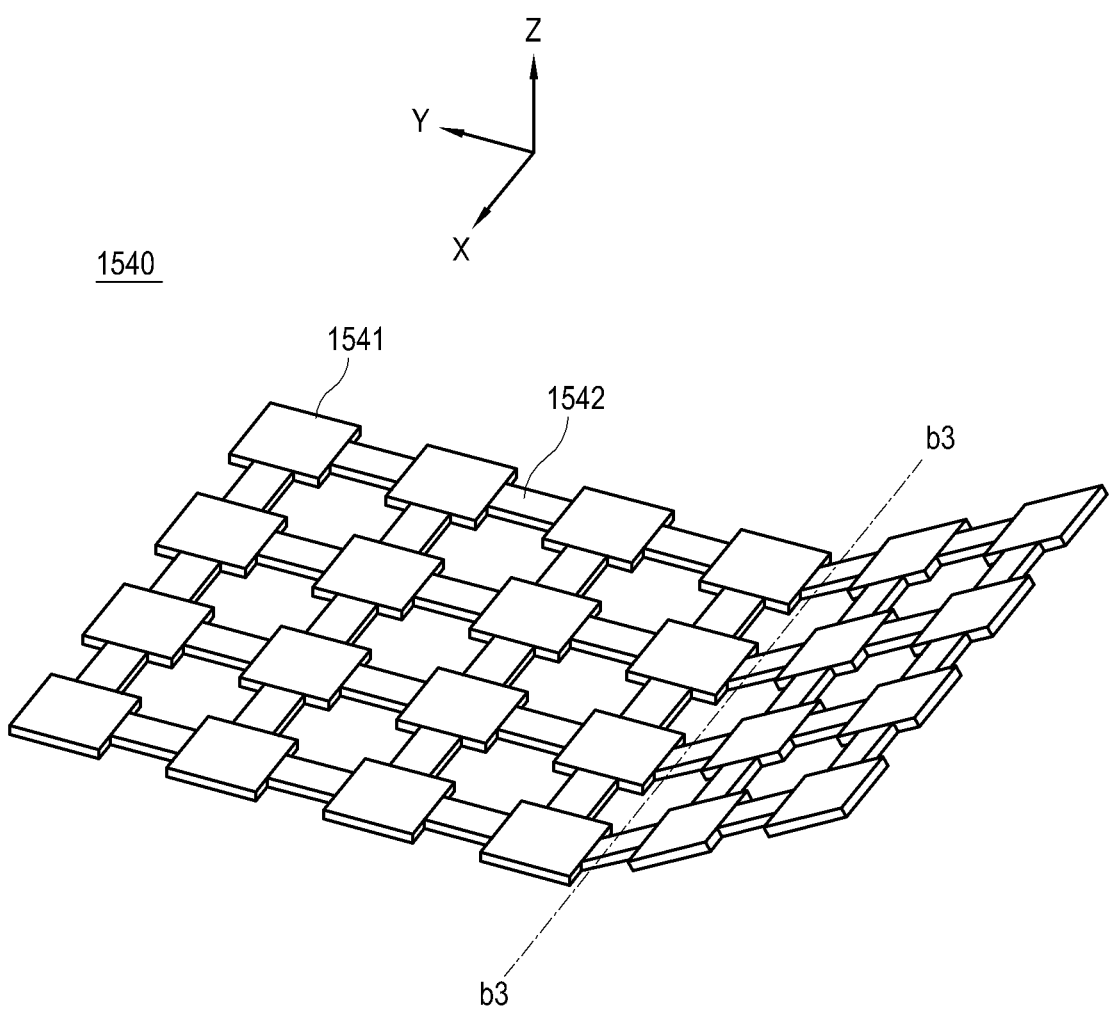
Figure 29:
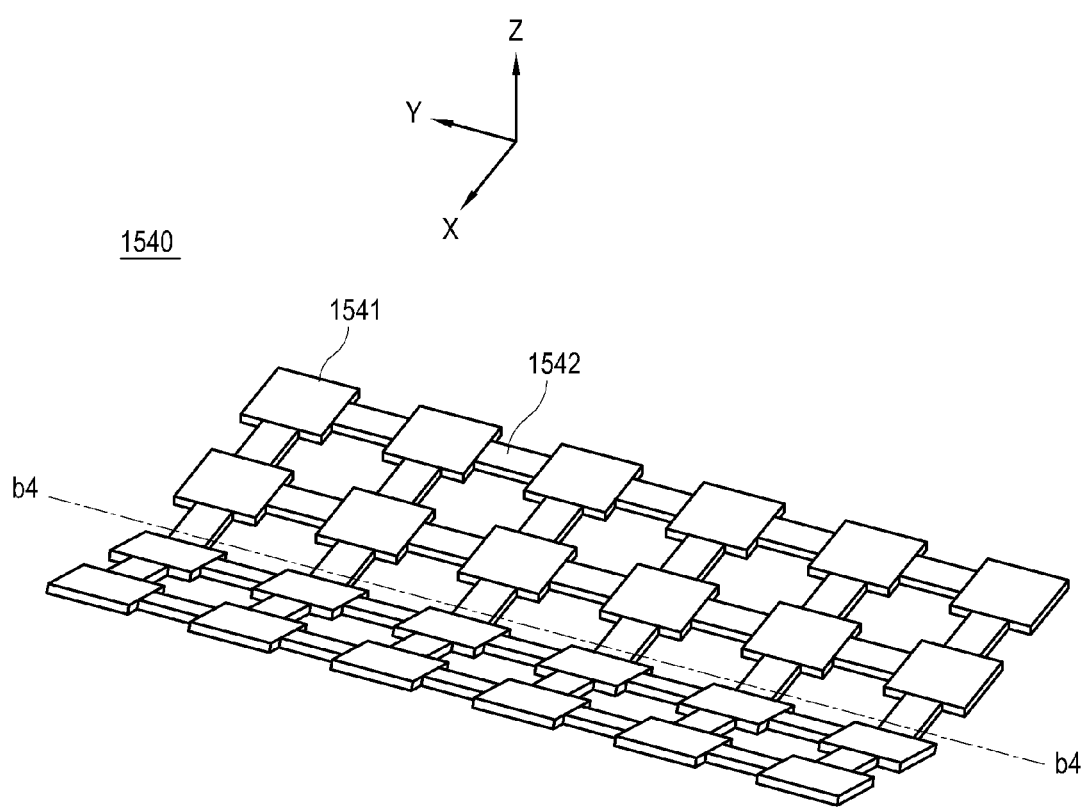

FIG. 24 and FIG. 25 illustrate types of an artificial muscle for connection between two plates in the panel support member applied to the display apparatus according to an exemplary embodiment.

As shown in FIG. 24, one pair of artificial muscles 1561 and 1562 is used for connection between two adjacent plates 1551 and 1552. Here, one pair of artificial muscles 1561 and 1562 is arranged in parallel along the Y direction axial line on the X-Y plane.

The reason why one pair of artificial muscles 1561 and 1562 are arranged in parallel is as follows. Since the respective artificial muscles 1561 and 1562 can move in different directions from each other, two artificial muscles 1561 and 1562 holds a balance of force, so that the panel support member can have various shapes. For example, when a force is equally applied to both two artificial muscles 1561 and 1562, the panel support member has a flat state.

As shown in FIG. 25, one pair of artificial muscles 1563 and 1564 connects two adjacent plates 1553 and 1554 with each other. In FIG. 25, one pair of artificial muscles 1563 and 1564 are arranged in parallel with each other along the Y direction axial line, but are spaced apart from each other in the Z direction axial line without being arranged on the same X-Y plane on the contrary to that of FIG. 24.

Below, various shapes, which the panel support member with this structure can have, will be described.

FIG. 26 to FIG. 30 are perspective views of showing various shapes of the panel support member 1540 applied to the display apparatus according to an exemplary embodiment, which is transformed by an external force.

As shown in FIG. 26 to FIG. 30, the panel support member 1540 includes a plurality of plates 1541 arranged parallel in the form of a matrix on the X-Y plane, and a plurality of artificial muscles 1542 connecting the plates 1541. In accordance with which direction what artificial muscle 1542 is transformed, the panel support member 1540 may be bent in various forms.

Figure 30:
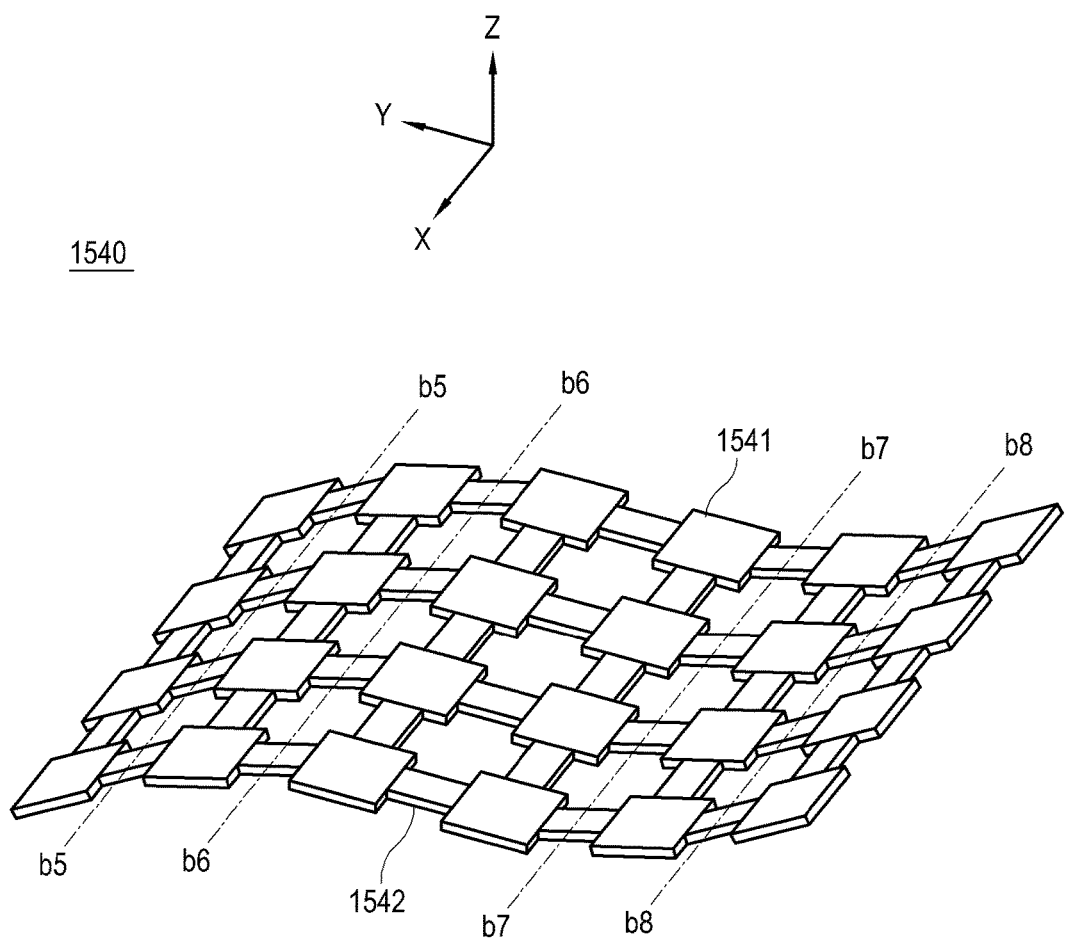

The lines b1, b2, b3, b4, b5, b6, b7 and b8 shown in FIG. 26 to FIG. 30 show bending lines of the panel support member 1540. As the artificial muscles 1542 on the bending line are transformed, the panel support member 1540 is bent. The bent panel support member 1540 may have only one bending line. However, as shown in FIG. 30, the bent panel support member 1540 may simultaneously have a plurality of bending lines b5, b6, b7 and b8. In this case, the panel support member 1540 may be bent in a more-complicated shape.

In this exemplary embodiment, a preset voltage is applied to the artificial muscles 1542 on the bending line b1, b2, b3, b4, b5, b6, b7, b8 so that the corresponding artificial muscles 1542 can maintain their current transformed states, thereby maintaining the current bending state of the panel support member 1540 bent by an external force. For this reason, the artificial muscle 1542, rather than a general flexible material, is used as an element for the connection between the plates 1541.

To make the panel support member 1540 do this operation, an element is needed for determining which artificial muscle 1542 is currently transformed, determining the transformed shape of the artificial muscle 1542, and determining how high a voltage level is required to maintain the determined transformed shape. Below, this element will be described.

Figure 31:
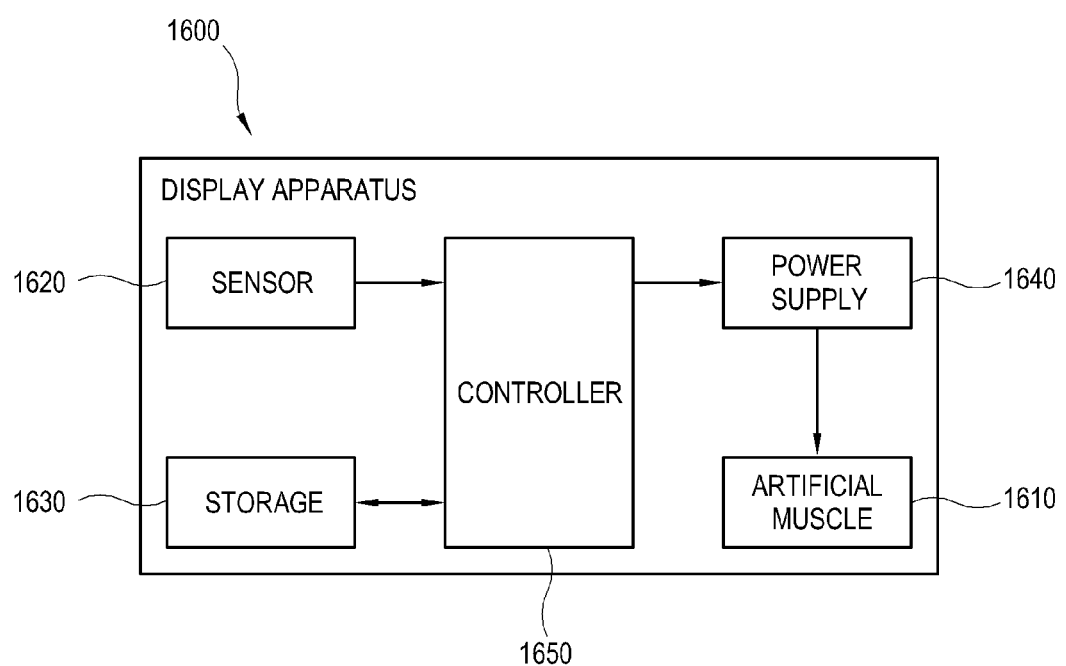
FIG. 31 is a block diagram of showing elements for controlling the artificial muscle in the display apparatus according to an exemplary embodiment.

FIG. 31 is a block diagram of showing elements for controlling an artificial muscle 1610 in a display apparatus 1600 according to an exemplary embodiment.

As shown in FIG. 31, the display apparatus 1600 includes an artificial muscle 1610, a sensor 1620, a storage 1630, a power supply 1640, and a controller 1650. These elements may be provided on the image processing board of the display apparatus 1600, or may be electrically connected to the image processing board.

The sensor 1620 senses the current bending state of the display apparatus 1600. The bending state to be sensed by the sensor 1620 may include a bending angle, a bending holding time, a pressure applied for bending, and the like of the display apparatus 1600 or the artificial muscle 1610. In accordance with sensing results, the sensor 1620 transmits information about the bending state to the controller 1650. The sensor 1620 may be variously implemented without being limited to a certain structure.

The storage 1630 stores a preset database (DB). The stored database designates identifications (IDs) of the plurality of artificial muscles 1610, and current or voltage levels respectively assigned to the IDs. If the artificial muscles 1610 are varied in transformed amount such as a transformed angle depending on applied voltages, the database designates the ID, the transformed amount of the respective ID, and the voltage level corresponding to the transformed amount.

The power supply 1640 supplies system power to the display apparatus 1600. The power supply 1640 may be provided to convert external power. However, if the display apparatus 1600 is the mobile apparatus, the power supply 1640 may be a battery. Under control of the controller 1650, the power supply 1640 selectively supplies the designated voltages to the respective artificial muscle 1610.

The controller 1650 retrieves the database from the storage 1630 in accordance with the sensing results of the sensor 1620, and controls the power supply 1640 to supply voltage to the artificial muscle 1610 in accordance with the database retrieving results. Specifically, the controller 1650 determines the bending state of each artificial muscle 1610 based on the sensing results of the sensor 1620, and obtains a voltage level corresponding to the bending state of each artificial muscle 1610 from the storage 1630. The controller 1650 controls the power supply 640 to supply the power of the obtained voltage level to the artificial muscle 1610.

The controller 1650 performs the foregoing operations after a preset time elapses from a point of time when the sensor 1620 senses the bending of the artificial muscle 1610, rather than performing the foregoing operations at the corresponding point of time. This is because a user needs to bend the display apparatus 1600 in many forms as desired before deciding the bending state of the display apparatus 1600. Therefore, the controller 1650 performs the foregoing operations if the bending state of the artificial muscle 1610 sensed by the sensor 1620 is maintained for a preset period of time.

In addition, the controller 1650 may determine whether the external force bending the display apparatus 1600 is applied by a user. If it is determined that the display apparatus 1600 is bent by a user, the controller 1650 performs the operations as mentioned above. On the other hand, if it is determined that the display apparatus 1600 is bent by not a user, the controller 1650 does not perform the foregoing operations.

There may be many methods of determining whether the external force of bending the display apparatus 1600 is caused by a user. For example, the display apparatus 1600 may include pressure sensors in one or more areas, and the controller 1650 may determine that the bending is caused by a user if the bending is sensed by the sensor 1620 in the state that the pressure is sensed by the pressure sensor. Alternatively, the controller 1650 may determine that the bending is caused by a user if the bending is sensed by the sensor 1620 while the display panel of a touch screen is being touched. Alternatively, the display apparatus 1600 may include an acceleration sensor or gyro sensor, and the controller may determine that the bending is caused by a user in the state that a certain sensing result is drawn by the acceleration sensor or gyro sensor. Besides, there are various methods.

The sensor 1620 may be variously designed to sense the current bending state of the display apparatus 1600 without being limited to a certain design. Below, some examples of the sensor 1620 will be described.

Figure 32:
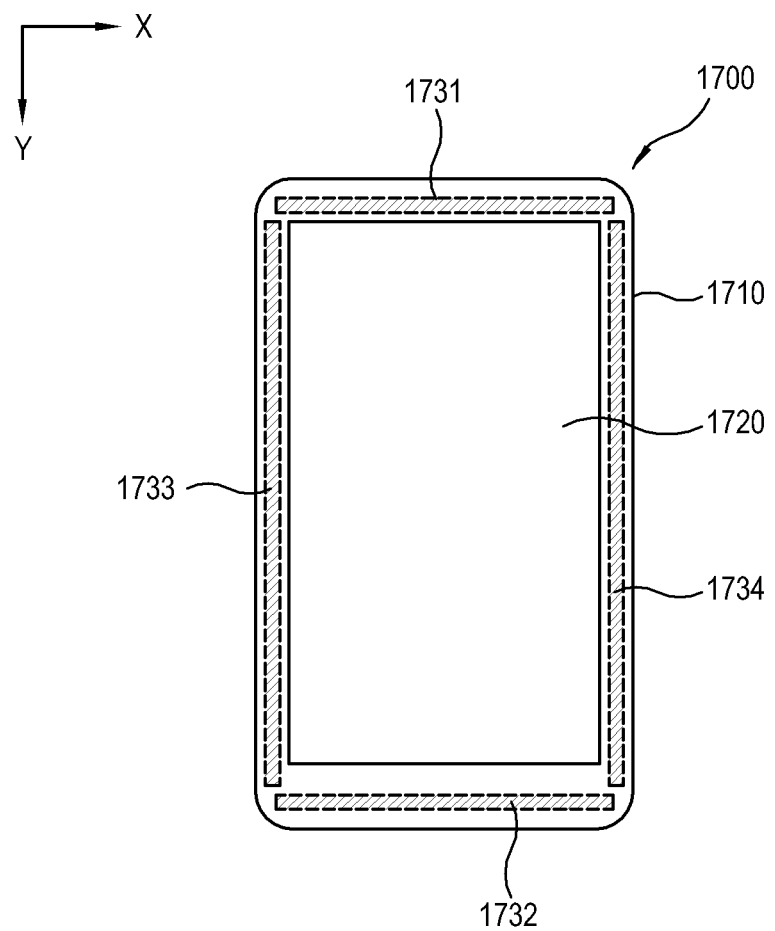
FIG. 32 illustrates a type of a sensor applied to the display apparatus according to an exemplary embodiment.

FIG. 32 illustrates a type of sensors 1731, 1732, 1733 and 1734 applied to a display apparatus 1700 according to an exemplary embodiment.

As shown in FIG. 32, if the display apparatus 1700 is laid down on the X-Y plane to make the display panel 1720 face upward, bending sensors 1731, 1732, 1733 and 1734 may be provided at edges in four up, down, left and right directions of the housing 1710 and extended along the edges of the housing 1710. The bending sensors 1731, 1732, 1733 and 1734 are shaped like a bar extended in one direction, and digitize and output the bending state of each area if the bending is caused by an external force.

The bending sensors 1731, 1732, 1733 and 1734 includes a first bending sensors 1731 extended along the X direction at an upside of the housing 1710, a second bending sensors 1732 extended along the X direction at a downside of the housing 1710, a third bending sensors 1733 extended along the Y direction at a left-side of the housing 1710, and a fourth bending sensors 1734 extended along the Y direction at a right-side of the housing 1710. With these four bending sensors 1731, 1732, 1733 and 1734, it is possible to determine which form the display apparatus 1700 is bent in with regard to the X-Y plane.

Figure 33:
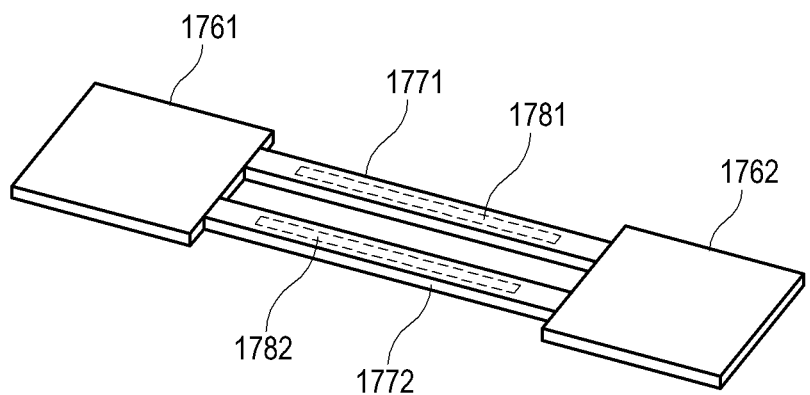
FIG. 33 illustrates another type of the sensor applied to the display apparatus according to an exemplary embodiment.

FIG. 33 illustrates another type of sensors 1781 and 1782 applied to the display apparatus according to an exemplary embodiment.

As shown in FIG. 33, a panel support member 1760 includes a plurality of plates 1761 and 1762, and artificial muscles 1771 and 1772 flexibly connecting two adjacent plates 1761 and 1762. The panel support member 1760 is substantially the same as those described in the foregoing embodiments, and thus repetitive descriptions thereof will be omitted.

The bending sensors 1781 and 1782 are respectively embedded in the artificial muscles 1771 and 1772. For instance, if one or more of the artificial muscles 1771 and 1772 is bent, the corresponding bending sensors 1781 and 1782 embedded in the artificial muscles 1771 and 1772 sense the bending state. Thus, it is possible to determine which form the panel support member 1760 or the display apparatus 1700 is bent in, by synthesizing the sensing results output from the bending sensors 1781 and 1782 embedded in all the artificial muscles 1771 and 1772.

Since the bending sensors 1781 and 1782 respectively sense the bending states of the artificial muscles 1771 and 1772, it is possible to apply voltage of levels suitable for the artificial muscles 1771 and 1772 to the corresponding artificial muscles 1771 and 1772 without determining the bending state of the whole of the display apparatus.

Below, a method of controlling the display apparatus according to an exemplary embodiment will be described.

Figure 34:
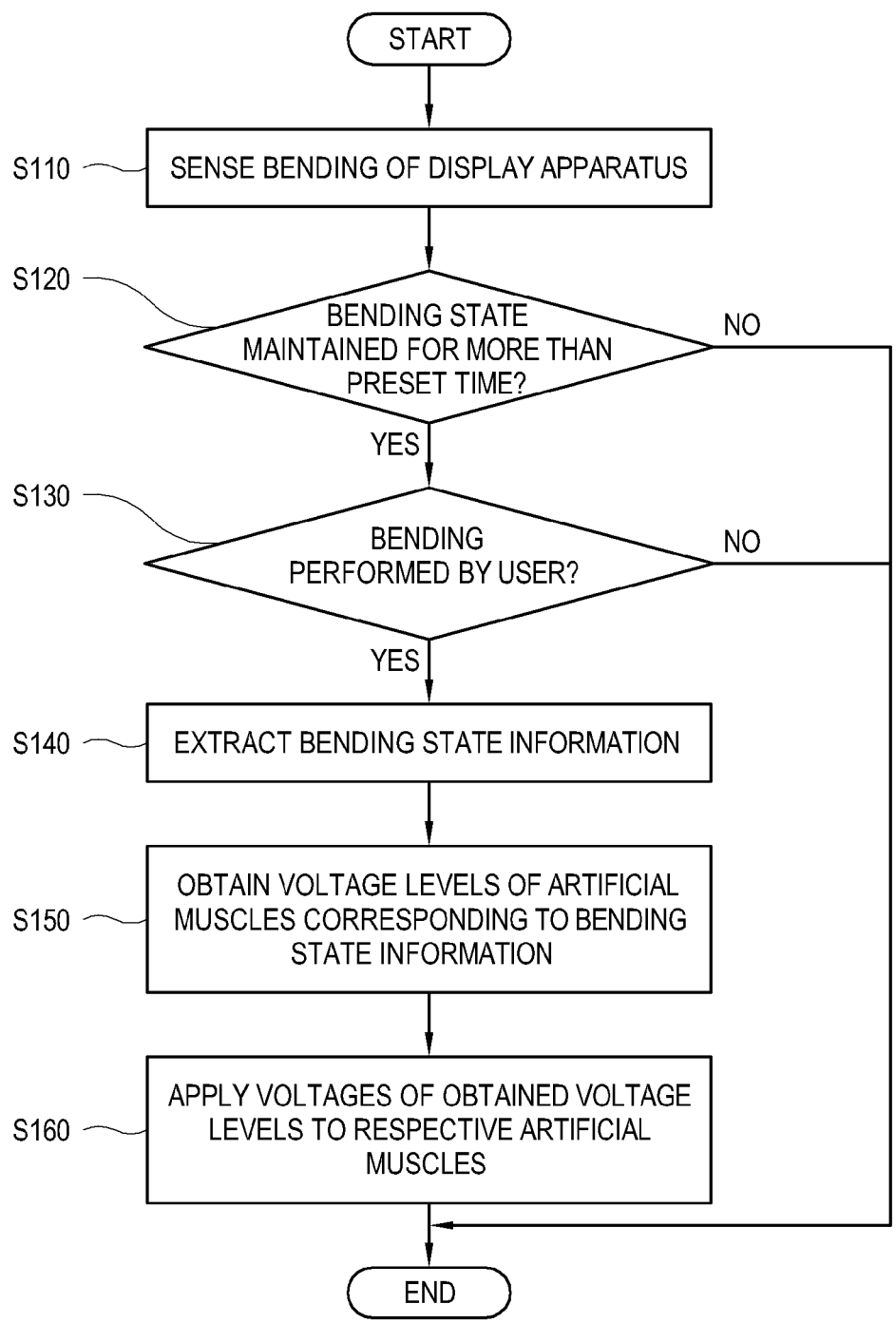
FIG. 34 is a flowchart of illustrating a processing of maintaining a bending state of the display apparatus according to an exemplary embodiment.

FIG. 34 is a flowchart of illustrating a processing of maintaining a bending state of the display apparatus according to an exemplary embodiment As shown in FIG. 34, at operation S110, the display apparatus senses bending.

At operation S120, the display apparatus determines whether a bending state is maintained for more than a preset time.

If it is determined that the same bending state is maintained for more than the preset time, at operation S130 the display apparatus determines whether the bending is caused by a user.

If it is determined that the bending of the display apparatus is caused by a user, at operation S140 the display apparatus extracts bending state information.

At operation S150, the display apparatus obtains voltage levels for the artificial muscles corresponding to the bending state information.

At operation S160, the display apparatus applies voltage of obtained voltage levels to the respective artificial muscles.

With these operations, the display apparatus can maintain the shape of the display apparatus as it is bent by a user.

In the foregoing exemplary embodiments, the display apparatus is configured to apply voltage to the artificial muscles so as to maintain a shape as transformed by a user, but not limited thereto. Alternatively, the display apparatus may apply voltage to the artificial muscles in response to a user's instruction through a user interface (UI), thereby bending the display apparatus. Below, this exemplary embodiment will be described.

Figure 35:
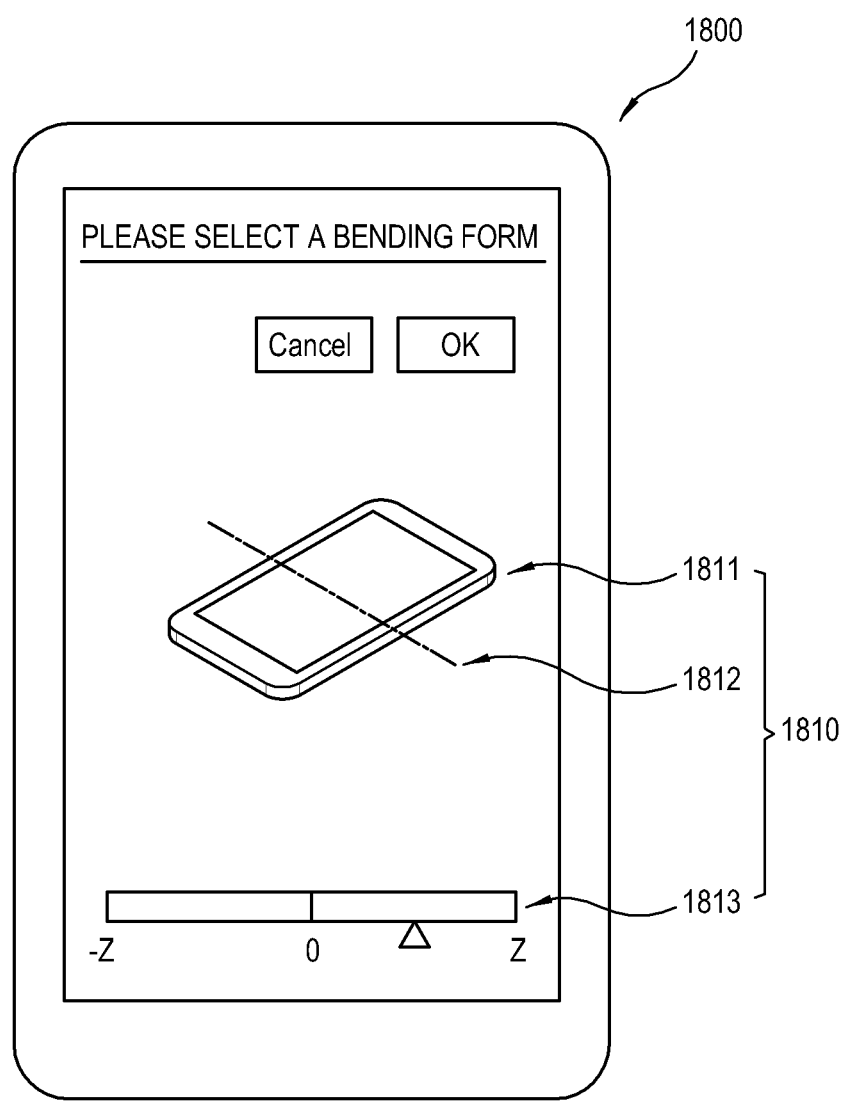
FIG. 35 illustrates a user interface (UI) displayed on the display apparatus according to an exemplary embodiment.

FIG. 35 illustrates a user interface (UI) 1810 displayed on a display apparatus 1800 according to an exemplary embodiment.

As shown in FIG. 35, the display apparatus 1800 displays a UI 1810 through which a user can bend the display apparatus 1800 in a desired direction.

There are no limits to the UI 1810 as long as it can be used for designating the bending shape of the display apparatus 1800. The UI 1810 shown in FIG. 35 is merely an example of realizable embodiments.

The UI includes an object 1811 depicting the display apparatus 1800. A user draws a bending line 1812 by dragging on the object 1811, thereby selecting the bending line 1812 at which the display apparatus 1800 will be bent.

Further, the UI 1810 includes a slider 1813 for selecting how much the display apparatus 1800 will be bent at the bending line 1812 in the Z axial direction or −Z axial direction. A user adjusts the slider 1813 left or right to thereby select a bending degree in the area corresponding to the bending line 1812.

If the bending state is selected through the UI 1810, the display apparatus 1800 is bent based on the selected bending state. The display apparatus 1800 can be bent by itself by applying voltage levels suitable for the selected bending state to the internal artificial muscle so as to have the bending state selected through the UI 1810.

That is, the display apparatus 1800 according to an exemplary embodiment is not to maintain the state discretionally bent by a user but is bent by itself from a flat state in response to a user's input. Such an automatic bending method is advantageous since bending information is input by a user and therefore there is no need of determining whether the bending of the display apparatus 1800 is caused by a user.

Below, a process of automatically bending the display apparatus 1800 will be described.

Figure 36:
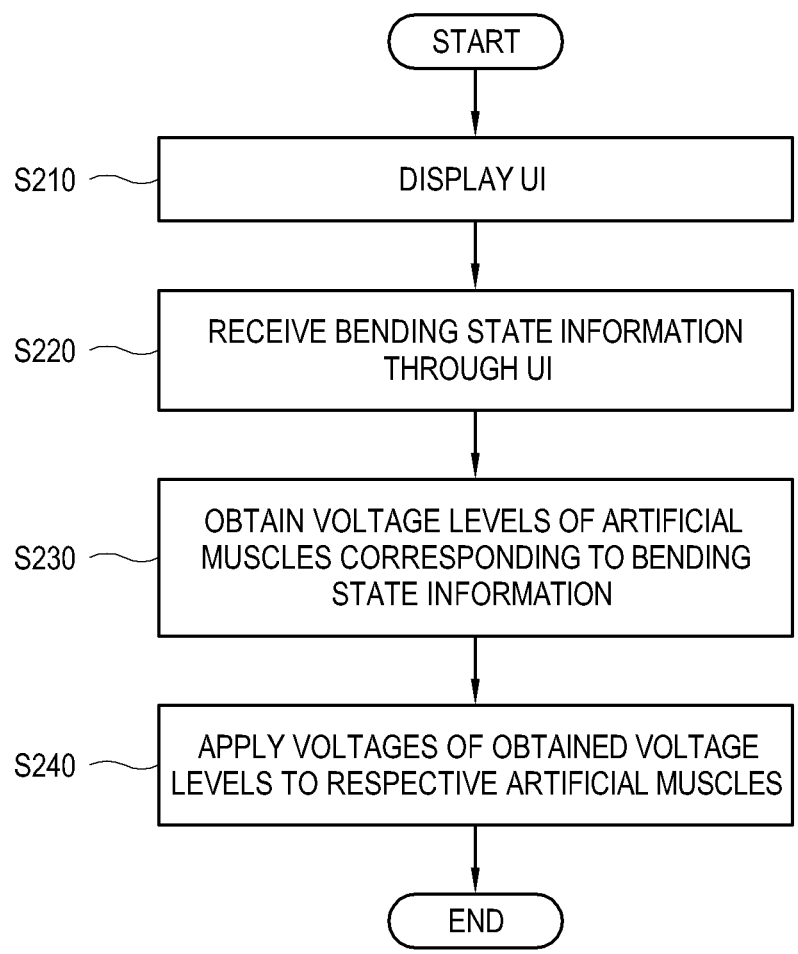
FIG. 36 is a flowchart of automatically bending the display apparatus according to an exemplary embodiment in response to a user's input.

FIG. 36 is a flowchart of automatically bending the display apparatus according to an exemplary embodiment in response to a user's input.

As shown in FIG. 36, at operation S210 the display apparatus displays a UI for designating the bending state.

At operation S220, the display apparatus receives bending state information input by a user through the UI.

At operation S230, the display apparatus obtains voltage levels for the artificial muscles corresponding to the received bending state information.

At operation S240, the display apparatus applies voltage of obtained voltage levels to the respective artificial muscles, thereby bending the display apparatus.

Below, an embodiment, where the channel support member with the foregoing structure is applied to the display apparatus bent in the form of a folder, will be described.

Figure 37:
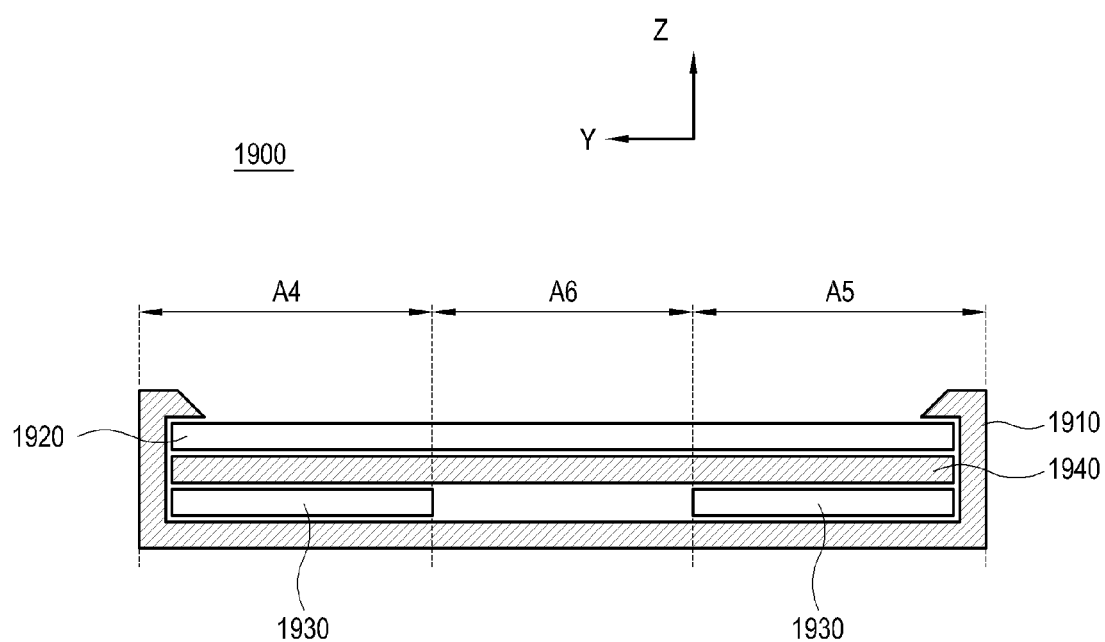
FIG. 37 is a lateral cross-section of showing the internal structure of the display apparatus according to an exemplary embodiment.

FIG. 37 is a lateral cross-section of showing an internal structure of a display apparatus 1900 according to an exemplary embodiment.

As shown in FIG. 37, the display apparatus 1900 according to an exemplary embodiment has a flexible structure in only a middle area A6 among the whole areas A4, A5 and A6, and has a rigid structure in the other areas A4 and A5. That is, the display apparatus 1900 can be folded up since the middle area A6 is bendable.

The display apparatus 1900 includes a housing 1910, a display panel 1920, an image processing board 1930, and a panel support member 1940. Here, the flexible structure or rigid structure is not applied to all the elements.

It is difficult to separately apply the flexible structure to the middle area A6, and thus the whole display panel 1920 has the flexible structure.

The housing 1910 may have a double structure where edge areas A4 and A5 include a rigid material and the middle area A6 includes the flexible material, or may wholly have the flexible material. In the housing 1910, a lateral portion of the middle area A6 may have a multi-joint structure or contain a material freely contracted and expanded, thereby allowing the middle area A6 to be bent. However, the image processing board 1930 may have the rigid structure since it can be arranged in at least one of the edge areas A4 and A5 instead of the middle area A6.

The panel support member 1940 is installed throughout the areas A4, A5 and A6 so as to uniformly support the back of the display panel 1920. Since there is no need to consider the bending in the edge areas A4 and A5, the panel support member 1940 has the rigid structure in the edge areas A4 and A5. On the other hand, the bending has to be considered in the middle area A6, and therefore the panel support member 1940 has to have the flexible structure in the middle area A6. That is, the panel support member 1940 is provided so that the edge areas A4 and A5 can be different in structure from the middle area A6.

Figure 38:
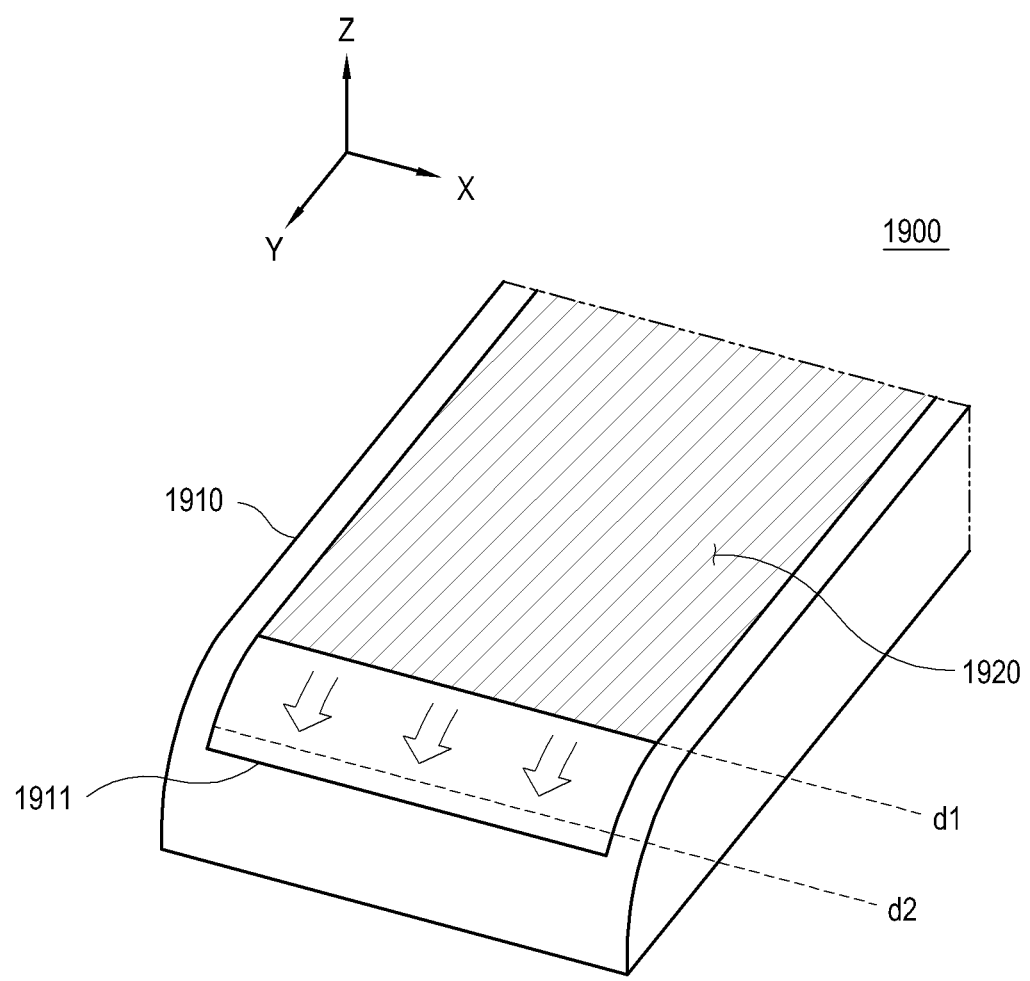
FIG. 38 is a perspective view of showing one end portion of the display apparatus when the display apparatus according to an exemplary embodiment is bent.

FIG. 38 is a perspective view of showing one end portion of the display apparatus 1900 when the display apparatus 1900 according to an exemplary embodiment is bent.

As shown in FIG. 38, in the state that the display apparatus 1900 is folded up forward with respect to the middle area, the display panel 1920 is urged to contract. In this state, it is not easy to design the display panel 1920 to contract together with the housing 1910. Therefore, at least one of a Y directional end and a −Y directional end of the housing 1910 is formed with a panel accommodating portion 1911 where the display panel 1920 can slide along the Y direction axial line.

If the display apparatus 1900 is in a flat state, the panel accommodating portion 1911 is not necessary since the display panel 1920 is in position. The end of the display panel 1920 is in position d1. Further, if the display apparatus 1900 is folded up backward with respect to the middle area, the display panel 1920 is urged to expand. In this case, the panel accommodating portion 1911 is also unnecessary.

However, if the display apparatus 1900 is folded up forward with respect to the middle area, the display panel 1920 is urged to contract. In this case, one end of the display panel 1920 slides toward the panel accommodating portion 1911. That is, the end of the display panel 1920 moves from d1 to d2.

Below, a structure of the channel support member will be described.

Figure 39:
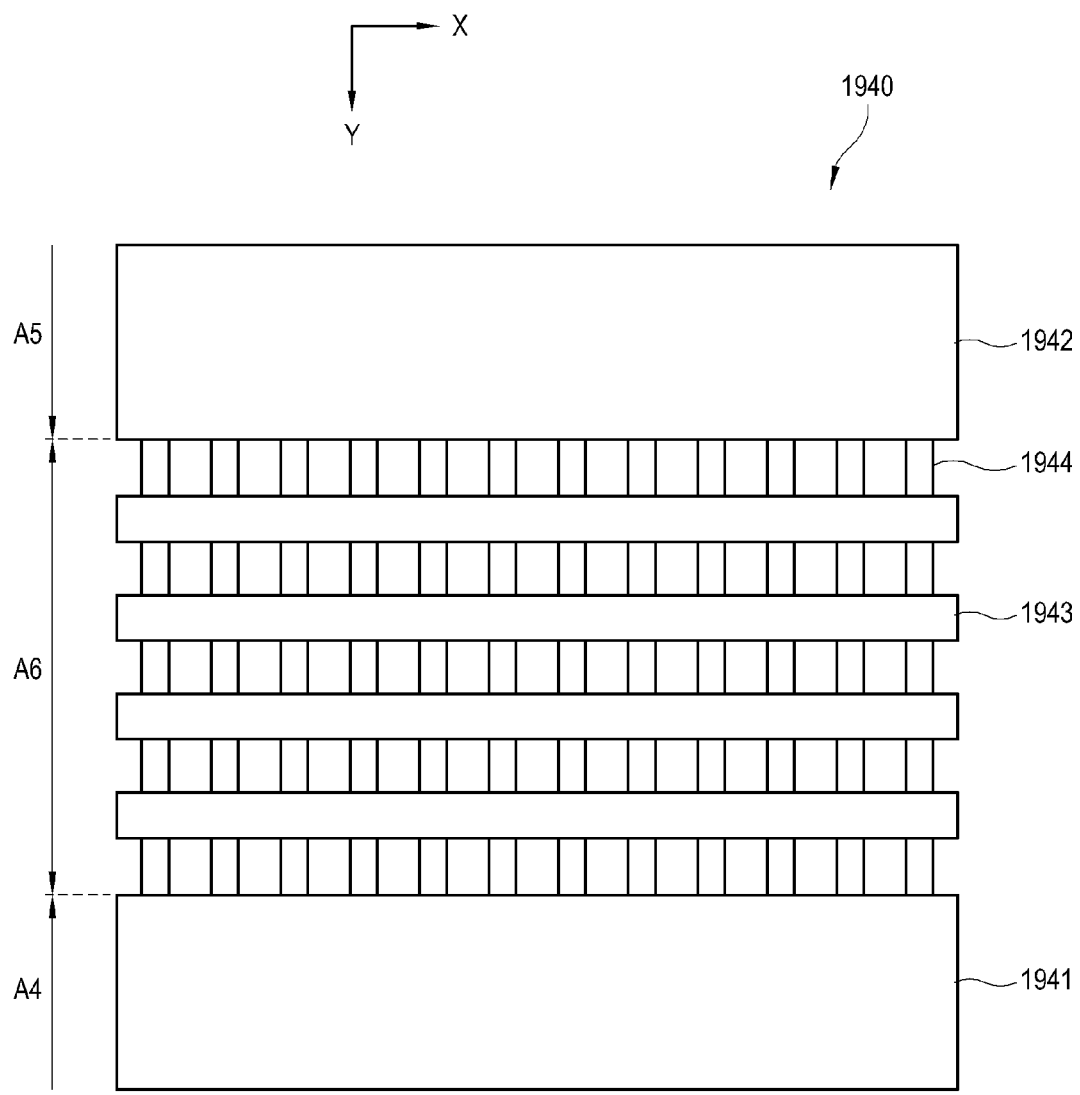
FIG. 39 is a plan view of showing a channel support member applied to the display apparatus according to an exemplary embodiment.

FIG. 39 is a plan view of showing a channel support member 1940 applied to the display apparatus according to an exemplary embodiment.

As shown in FIG. 39, the channel support member 1940 has a structure corresponding to the edge areas A4 and A5 and a structure corresponding to the middle area A6, which are different from each other, on the X-Y plane. Since there is no need to consider the bending in the edge areas A4 and A5, the channel support member 1940 includes rigid plates 1941 and 1942 in the edge areas A4 and A5.

However, the bending has to be taken into account in the middle area A6, and thus the channel support member 1940 includes a plurality of plates 1943 extended in one direction within the middle area A6, and an artificial muscle 1944 for connection between the plurality of plates 1943. If the channel support member 1940 becomes bent along the Y direction axial line, the plates 1943 are extended along the X direction axial line perpendicular to the Y direction axial line, and the artificial muscles are extended along the Y direction axial line. The plates 1943 and the artificial muscles 1944 are substantially the same as those of the foregoing exemplary embodiment, and thus repetitive descriptions thereof will be omitted.

Figure 40:
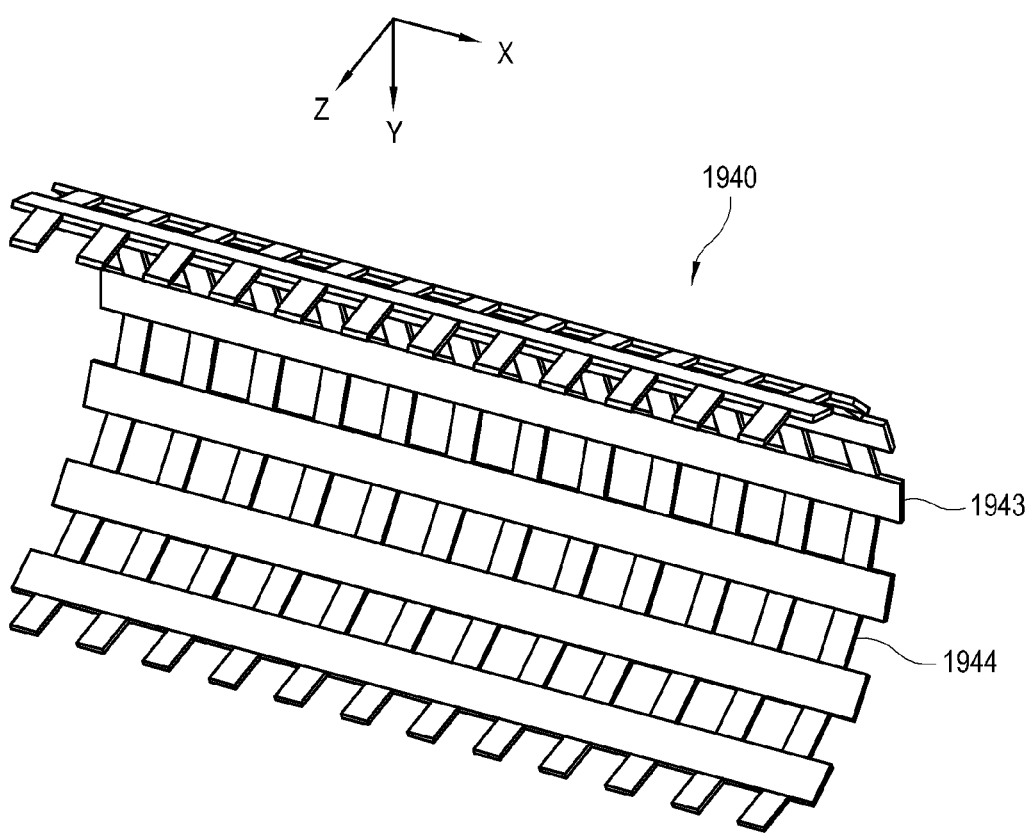
FIG. 40 is a partial perspective view of showing that the channel support member of FIG. 39 is bent forward along an axial direction of Y.

FIG. 40 is a partial perspective view of showing that the channel support member 1940 of FIG. 39 is bent forward along the Y direction axial line.

In the channel support member 1940 as shown in FIG. 40, the plates 1943 are extended in the X direction, and the artificial muscles 1944 connect two adjacent plates 1943 along the Y direction. When the channel support member 1940 is bent, one or more bending lines are formed along the X direction axial line. As the artificial muscles 1944 are transformed corresponding to the respective bending lines, the channel support member 1940 is bent the Z direction or the −Z direction. Such a bending state may be achieved by applying voltage to the artificial muscles 1944 in the state that a user discretionally bends the channel support member 1940 and maintaining the bending state, or by applying voltage to the respective artificial muscles 1944 in the state that the channel support member 1940 is in a flat state and changing the channel support member 1940 from the flat state to the bending state.

In this exemplary embodiment, the reason why the plates 1943 are extended along the X direction axial line is because the channel support member 1940 is provided to be bent along the Y direction axial line. To make the channel support member 1940 be bent along the X direction axial line, the plates 1943 have to be extended along the Y direction axial line. To make the channel support member 1940 be bent along both the X direction axial line and the Y direction axial line, the channel support member 1940 has to have the same structure as that of FIG. 23.

Figure 41:
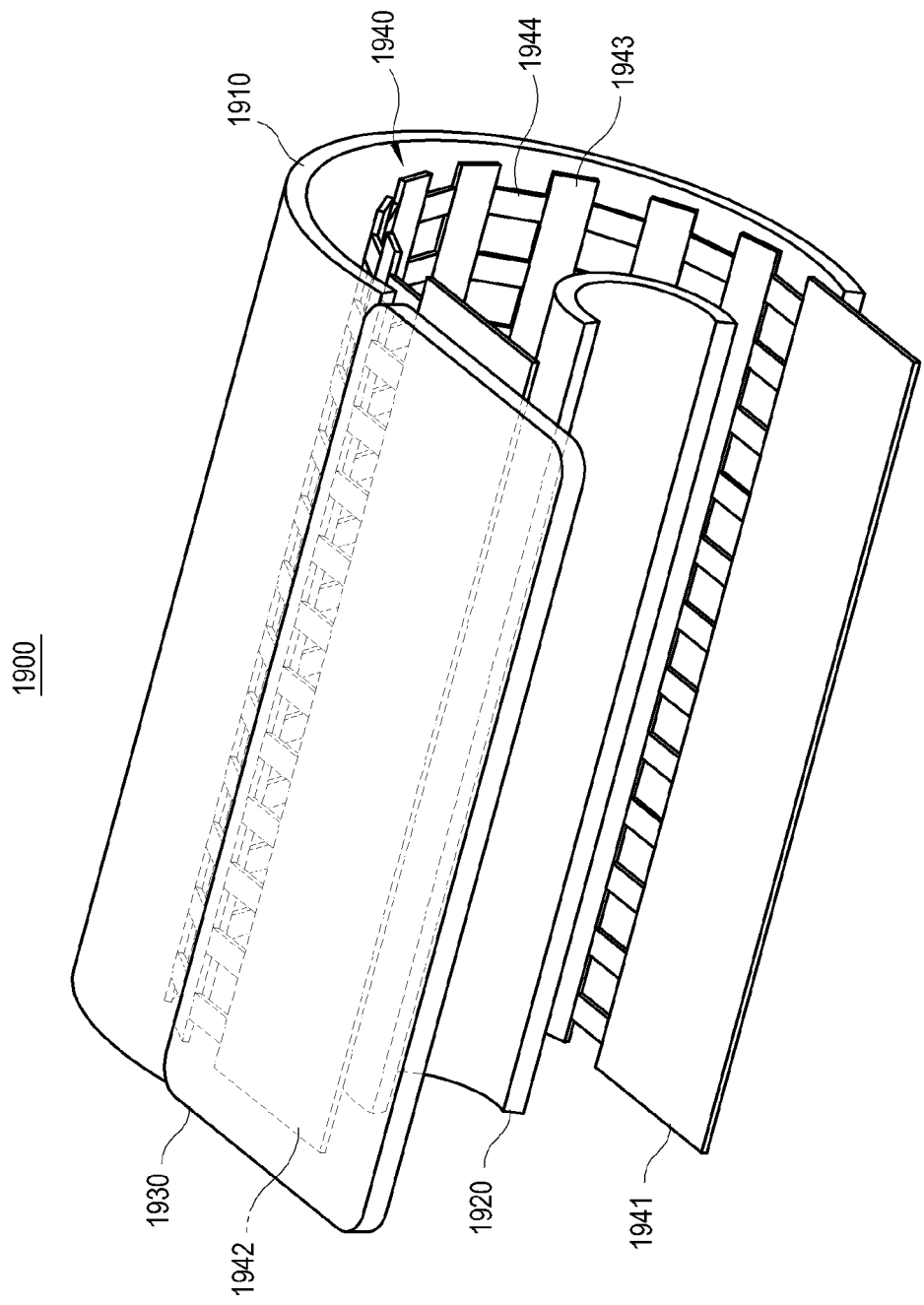
FIG. 41 is a partial perspective view of showing that individual elements are bent when the display apparatus according to an exemplary embodiment is bent forward.

FIG. 41 is a partial perspective view of showing that individual elements are bent when the display apparatus 1900 according to an exemplary embodiment is bent forward.

As shown in FIG. 41, when the middle area of the display apparatus 1900 is bent forward in the form of a folder, the display panel 1920 at the inside is urged to contract and the housing 1910 at the outside is urged to expand. The channel support member 1940 is bent in the middle area and supports the display panel 1920 behind the display panel 1920.

The image processing board 1930 has a rigid structure since it is in an area corresponding to no bending. Further, the plates 1941 and 1942 provided at the upper and lower sides of the channel support member 1940 have the rigid structure since they are in the areas corresponding to no banding. On the other hand, as the display apparatus 1900 becomes bent, the artificial muscles 1944 placed in the middle area and supporting the plates 1943 are also bent. Since the plates 1943 are extended in a transverse direction to the bending direction axial line, i.e., extended in a parallel direction with the bending line, there is no interference with the bending of the display apparatus 1900.

With this configuration, the display apparatus 1900 is bendable.

Similar to the other elements of the display apparatus, the battery may have the flexible structure. However, the battery may have a rigid structure unavoidably.

Figure 42:
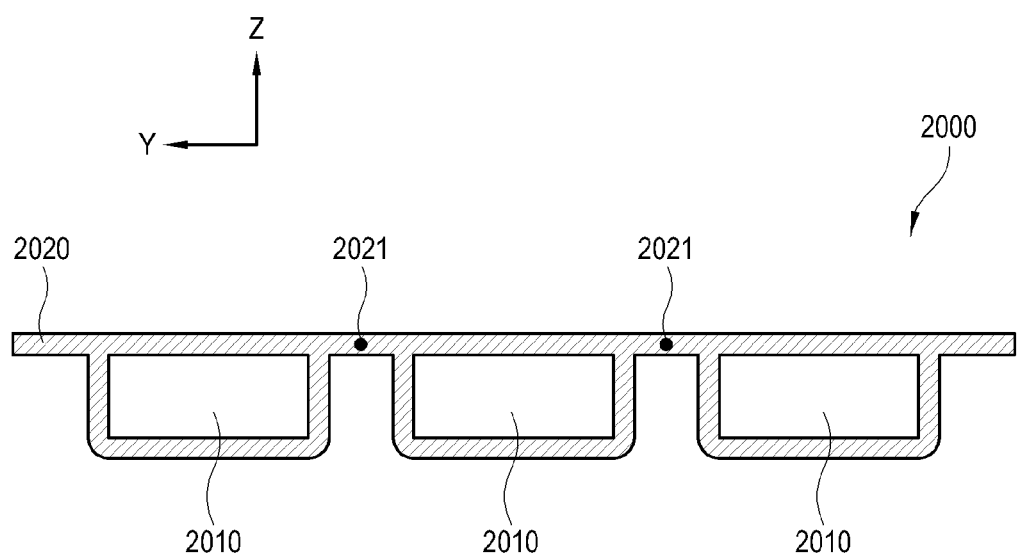
FIG. 42 is a cross-section view of a battery according to an exemplary embodiment.

FIG. 42 is a cross-section view of a battery 200 according to an exemplary embodiment.

As shown in FIG. 42, the battery 2000 includes a plurality of unit batteries 2010, and a battery housing 2110 that is flexible and accommodates each unit battery 2010. The unit battery 2010 is a battery cell having a rigid structure. The battery housing 2110 physically couples the plurality of unit batteries 2010 arranged in a row along the Y direction axial line and has a wiring structure for electrically connecting the unit batteries 2010.

A region of the battery housing 2110, which is formed between two adjacent unit batteries 2010, will be called a node 2021. With respect to the node 2021, the battery 2000 is bent in the Z direction or the −Z direction.

Figure 43:
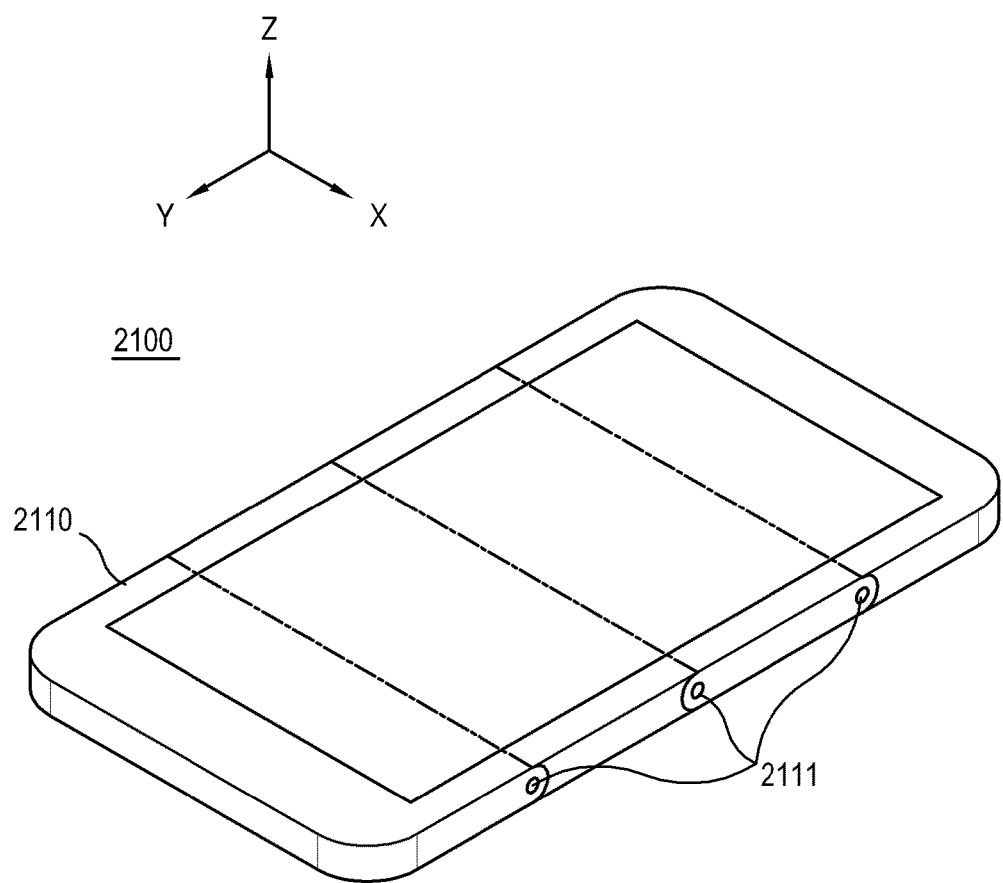
FIG. 43 illustrates the display apparatus according to an exemplary embodiment.

FIG. 43 illustrates the display apparatus 2100 according to an exemplary embodiment.

As shown in FIG. 43, the display apparatus 2100 includes the housing 2110 having a plurality of hinges 2111 to have a bendable structure. One or more hinges 2111 are provided along the Y direction axial line, so that the housing 2110 can have a multi-joint structure.

If there are three hinges 2111 as shown therein, the display apparatus 2100 is divided into four areas along the Y direction axial line. The batteries are respectively arranged in the plurality of areas divided with respect to the hinges 2111. The image processing board should be arranged in at least one of these areas. Therefore, the image processing board and the battery may be selectively arranged in the respective areas, or a mini battery may be embedded in the image processing board.

Figure 44:
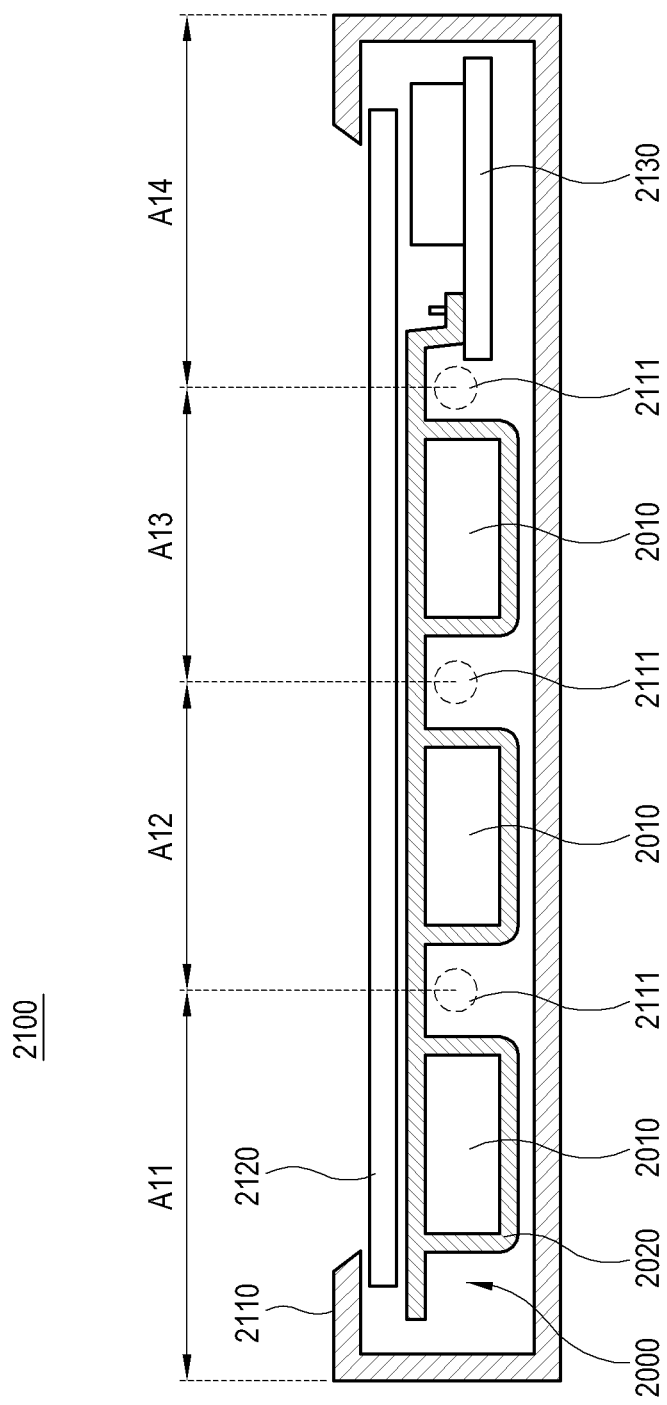
FIG. 44 is a cross-section view of illustrating that the battery of FIG. 42 is applied to the display apparatus of FIG. 43.

FIG. 44 is a cross-section view of illustrating that the battery 2000 of FIG. 42 is applied to the display apparatus 2100 of FIG. 43.

As shown in FIG. 44, the display apparatus 2100 includes the housing 2110, a display panel 2120, and an image processing board 2130. Here, the display panel 2120 has the flexible structure, and the housing 2110 is bendable with the multi-joint structure having three hinges 2111.

The display apparatus 2100 is bendably divided into four areas A11, A12, A13 and A14 with respect to the hinges 2111, and the areas A11, A12, A13 and A14 in the housing 2110 are respectively formed with accommodating spaces. Each accommodating space may accommodate the battery 2000 and the image processing board 2130 therein.

For example, the areas A11, A12 and A13 respectively accommodate the unit batteries 2010 of the battery 2000, the area A14 accommodates the image processing board 2130, and the battery 2000 and the image processing board 2130 are electrically connected. Thus, the unit battery 2010 and the image processing board 2130, which are rigid, are accommodated in the areas A11, A12, A13 and A14, and the battery housing 2110 is flexible in the areas where the hinges 2111 are positioned. Therefore, when the display apparatus 2100 is bent with respect to the hinges 2111, there is no interference with the bending operation.

In the case of the display apparatus having the foregoing structure shown in FIG. 22 and FIG. 23, a plurality of mini batteries are respectively arranged on the lower surfaces of the plates 1541 (see FIG. 23) and electrically connected by a flexible cable. Since the upper surfaces of the plates 1541 (see FIG. 23) are areas for supporting the display panel, the mini batteries are arranged on the lower surfaces of the plates 1541 (see FIG. 23).

Below, elements corresponding to functions of the image processing board applied to the display apparatus according to an exemplary embodiment will be described.

FIG. 45 is a block diagram of the image processing board 2200 in the display apparatus according to an exemplary embodiment.

As shown in FIG. 45, the image processing board 2200 of the display apparatus includes a communicator 2210 configured to communicate with the exterior, a signal processor 2240 configured to process signals and outputs the processed signals to a display 2220 and a loudspeaker 2230, and a central processing unit (CPU) 2250 configured to perform calculation and control for operating the signal processor 2240.

In this exemplary embodiment, the CPU 2250 is provided independently of the signal processor 2240, but not limited thereto. Alternatively, the CPU 2250 may be provided as a system-on-chip (SOC) by integrating with the signal processor 2240 and the like chipsets having various functions.

The communicator 2210 performs interactive communication to receive transport stream transported from various content sources or transmit data from the signal processor 2240 to the exterior. The communicator 2210 is achieved by communication ports or an assembly of communication modules respectively corresponding to a plurality of communication standards, and a supportable protocol and a communication connection target are not limited to a certain kind or type.

For example, the communicator 2210 may include one or more of a wireless communication module 2212 such as a radio frequency integrated chip (RFIC), a Bluetooth module, or wireless fidelity (Wi-Fi) for wireless network communication; an Ethernet module 2213 for wired network communication, a universal serial bus (USB) port for local connection of a memory; an infrared sensor for sensing an infrared ray when a remote controller emits the infrared ray, etc.

In this exemplary embodiment, the communicator 2210 connects with various content sources through a broadcast network and a broadband network, and receives content data from the respective content sources. Here, the communicator 2210 has multiple ways of selectively transmitting content data from the respective content sources to the signal processor 2240.

For example, the communicator 2210 may include unit modules for respectively communicating the content sources, and the unit modules may be individually inactivated by the CPU 2250, so that the content data received in an activated unit module can be transmitted to the signal processor 2240. Further, content data may be transmitted from the unit module designated by the CPU 2250 to the signal processor 2240 while the communicator 2210 receives the content data through the respective unit module.

The signal processor 2240 performs various processes to a transport stream received in the communicator 2210. When the transport stream is received in the communicator 2210, the signal processor 2240 performs image processing processes with regard to a video signal extracted from the transport stream, and outputs the processed video signal to the display 2220 to be displayed on the display 2220.

There is no limit to the kind of image processing process performed by the signal processor 2240, and the image processing process may for example include de-multiplexing for separating an input transport stream into sub-streams such as a video signal, an audio signal and additional data; decoding corresponding to image formats of a video signal; de-interlacing for converting a video signal from an interlaced type into a progressive type, scaling for adjusting the image signal to have a preset resolution, noise reduction for improving image quality, detail enhancement, frame refresh rate conversion, etc.

The signal processor 2240 is provided to perform various processes in accordance with the kind, characteristic, etc. of a signal or data, and therefore the processes to be performed by the signal processor 2240 are not limited to the image processing processes. Further, the data processible by the signal processor 2240 is not limited to only that received in the communicator 2210. For example, the signal processor 2240 may perform audio processing process with regard to an audio signal extracted from the transport stream, and outputs the processed audio signal to the loudspeaker 2230. Further, if a user's speech is input to the display apparatus 2200, the signal processor 2240 processes the speech through preset voice recognition processes.

Such hardware components of the image processing board 2200 may be varied in details depending on the type and support functions of the image processing board 2200. For example, if the display apparatus supports a function of displaying an broadcasting image, there is a need of a component to be tuned to a certain frequency for a broadcast signal. However, if the display apparatus is a general tablet personal computer (PC), the component for receiving the broadcast signal may be excluded.

Below, details of the signal processor 2240 will be described on the assumption that the display apparatus is provided for displaying a broadcasting image.

FIG. 45 illustrates only basic components of the communicator 2210 and the signal processor 2240, but additional components are included in a real product.

In this exemplary embodiment, the signal processor 2240 is divided into a plurality of processors 2241, 2242 and 2243 in accordance with their respective functions, but the signal processor 2240 may be divided into hardware components, may be not divided in the real product, or may be achieved by combination of hardware and software. In this embodiment, the signal processor 2240 includes a video processor 2242 and an audio processor 2243. However, the signal processor 2240 may further include various processors in accordance with support functions.

The communicator 2210 includes one or more of a tuner 2211 configured to be tuned to a certain frequency for a broadcast stream, a wireless communication module 2212 configured to perform wireless communication with the exterior, and an Ethernet module 2213 configured to perform wired communication with the exterior. In FIG. 45, the communicator 2210 includes all of the tuner 2211, the wireless communication module 2212 and the Ethernet module 2213, but some elements may be excluded in the real product.

The signal processor 2240 includes a demultiplexer (DE-MUX) 2241 that divides a transport stream from the communicator 2210 into a plurality of sub-signals and outputs the sub-signals, an image processor 2242 that processes a video signal among the sub-signals output from the demultiplexer 2241 in accordance with the video processing processes and outputs the processed video signal to the display panel 2220, and an audio processor 2243 that processes an audio signal among the sub-signals output from the demultiplexer 2241 in accordance with the audio processing processes and outputs the processed audio signal to the loudspeaker 2230.

The tuner 2211 is tuned to a frequency of a certain designated channel for a broadcast stream and converts the broadcast stream into a transport stream. The tuner 2211 converts a high-frequency carrier wave into an intermediate frequency band and converts it into a digital signal, thereby generating a transport stream. To this end, the tuner 2211 has an analog/digital (A/D) converter. Alternatively, the A/D converter may be provided in not the tuner 2211 but a demodulator.

The wireless communication module 2212 performs wireless communication based on various protocols. The protocols include Wi-Fi, Wi-Fi direct, Bluetooth, universal plug and play (UPNP), near field communication (NFC), etc. The wireless communication module 2212 includes unit modules for communication based on corresponding protocols, in accordance with support protocols.

Below, each protocol will be described in brief.

Wi-Fi refers to a protocol of supporting wireless local area network based on institute of electrical and electronics engineers (IEEE) 802.11 and personal area network (PAN)/local area network (LAN)/wide area network (WAN), etc. In an infrastructure mode, Wi-Fi provides wireless communication relayed by access points (AP) between devices. In case of IEEE 802.11n, Wi-Fi guarantees the maximum transmission speed of 300 Mbps. The AP is connected to a router accessing an exterior WAN, and forms a hot spot of a predetermined range within an unclosed space. The display apparatus is positioned within the hot spot around the AP and wirelessly accesses the AP, thereby connecting and communicating with a network via the AP. Here, the range of the hot spot may be expanded by additionally installing a repeater or the like device for amplifying a signal. However, it is not proper for a user to use Wi-Fi for the wireless communication while s/he is moving since the hot spot generally has a narrow range.

Wi-Fi direct refers to a protocol which is based on peer-to-peer (P2P) and does not use the AP in Wi-Fi. Based on Wi-Fi direct, the display apparatus may directly connect and communicate with another apparatus without using the AP. Wi-Fi direct guarantees the maximum transmission speed of 250 Mbps within a distance of 200 m between the devices.

Wi-Fi direct utilizes a technique related to Ad-hoc among Wi-Fi techniques. An ad-hoc network is a communication network established with only mobile hosts without a stationary wired network. The ad-hoc network is suitable when it is difficult to establish the wired network or when it is used for a short time after establishing the network. The ad-hoc network has advantages that the network is quickly and inexpensively established since there is no limit to move the host and there is no need of a wired network and a base station. In the ad-hoc network, mobile nodes are used as not only hosts but also a kind of router, and multi-paths are set up with regard to other nodes or a path is dynamically set up. Wi-Fi direct is a technique achieved to improve transmission speed and security by remedying the ad-hoc technique's shortcomings.

Wi-Fi direct is fundamentally related to 1:1 connection, but 1:N connection is also possible. For instance, the display apparatus has the following processes in order to connect and communicate with an external apparatus such as a mobile device in accordance with a Wi-Fi direct protocol. The mobile device sends a connection request message to the display apparatus by a push method. If the display apparatus accepts the mobile device's connection request, a pairing is completed between the mobile device and the display apparatus.

Bluetooth is a direct communication method between devices based on IEEE 802.15.1 standards. Bluetooth uses an industrial scientific and medical (ISM) frequency of 2400 to 2483.5 MHz. However, to prevent interference with other systems using higher and lower frequencies, Bluetooth employs total 79 channels of 2402 to 2480 MHz except a band as much as 2 MHz after 2400 MHz and a band as much as 3.5 MHz before 2483.5 MHz.

Since many system use the same frequency band, electromagnetic interference is likely to occur between the systems. To prevent this, Bluetooth employs a frequency hopping technique. The frequency hopping technique is to transmit a packet (data) little by little while moving in many channels quickly in accordance with certain patterns. Bluetooth hops over 79 assigned channels 1600 times per second. Communication is accomplished when this hopping pattern is synchronized between Bluetooth devices. Since Bluetooth devices are connected as a master and a slave, the communication is not achieved between the two devices if the slave device is not synchronized with frequency hopping generated by the master device. Therefore, stable connection is expected without electromagnetic interferences with other systems. For reference, one master device can connect with up to seven slave devices. Here, communication between the master device and the slave device is possible, but communication between the slave devices is impossible. However, the roles of the master and the slave may be exchangeable with each other according to situations since they are not fixed.

UPNP is a protocol for connecting devices by a P2P method in accordance with digital living network alliance (DLNA). UPNP utilizes the existing protocols such as Internet protocol, tape carrier package (TCP), user datagram protocol (UDP), hypertext transfer protocol (HTTP), and extensible mark-up language (XML). UPNP is based on a wire protocol, in which information exchanged between devices is represented in the XML and communicated through the HTTP.

Wi-Fi, Bluetooth or the like protocol uses 48-bit media access control (MAC) address as a unique identifier of a communication module, whereas UPNP uses an identifier of universally unique identifier (UUID). UUID is an identifier of 16 octets, i.e., 128 bits, and is represented by 32 lowercase hexadecimal digits. UUID is a set of 32 characters or digits, represented by four hyphens, and has a total 36-digit number of "8-4-4-4-12".

NFC is one of radio-frequency identifications (RFID), which is a contactless short-range wireless communication protocol using a frequency band of 13.56 MHz. NFC is a technique to exchange data between devices at a near distance of about 10 cm, which is extended from ISO/IEC 14443. NFC operates based on electromagnetic induction between two adjacent loop antennas within a magnetic field.

NFC supports two modes of a passive communication mode and an active communication mode. In the passive communication mode, a starting device provides a carrier field, and a target device operates while modulating the provided fields. The target device of the passive communication mode acquires operation power from the electromagnetic field provided by the starting device, and thus the target device also serves as a transceiver. In the active communication mode, both the starting device and the target device communicate with each other by generating electric fields in itself. In the active communication mode, one device releases its own electromagnetic field until receiving data from an opponent, and activates its own electromagnetic field when transmitting data to the opponent.

Below, the elements of the signal processor 2240 will be described.

The demultiplexer 2241 performs operations opposite to those of a multiplexer. That is, the demultiplexer 2241 connects one input terminal with a plurality of output terminals, thereby distributing a stream input to the input terminal to the respective output terminals in accordance with a selection signal. For example, if there are four output terminals with regard to one input terminals, the demultiplexer 2241 may select each of four output terminals by combining two selection signals having a state of 0 or 1. The demultiplexer 2241, in particular when it is applied to the display apparatus, divides a transport stream received from the communicator 2210 into sub-signals of a video signal and an audio signal and outputs the sub-signals to the respective output terminals.

In the demultiplexer 2241, there may be many methods of dividing a transport stream into sub-signals. For example, the demultiplexer 2241 divides a transport stream into sub-signals in accordance with packet identifiers (PID) as identifiers respectively given to packets in the transport stream. The sub-signals corresponding to channels in the transport stream are independently compressed and packetized, and a packet corresponding to a certain channel is given the same PID to be distinguished from a packet corresponding to another channel. The demultiplexer 2241 sorts packets according to the PIDs in the transport stream, and extracts the sub-signals having the same PID.

The image processor 2242 decodes and scales a video signal output from the demultiplexer 2241 and outputs it to the display panel 2220. To this end, the image processor 2242 includes a decoder that restores a video signal encoded by a certain format to a previous video signal before encoding by reversing the encoding process, and a scaler that scales the decoded video signal to have a resolution of the display 2220 or a separately set resolution. If a video signal output from the demultiplexer 2241 is not encoded by a certain format, i.e., not compressed, the image processor 2242 does not perform the process of the decoder with regard to this video signal.

The audio processor 2243 amplifies an audio signal output from the demultiplexer 2241 and outputs it to the loudspeaker 2230. To this end, the audio processor 2243 includes a digital signal supplier that outputs a digital signal as an audio signal, a pulse width modulation (PWM) processor that outputs a PWM signal based on a digital signal output from the digital signal supplier, an amplifier that amplifies the PWM signal output from the PWM processor, and an LC filter that filters the PWM signal amplified by the amplifier in a certain frequency band in order to demodulate the PWM signal.

The CPU 2250 performs central calculation to operate general elements in the signal processor 2240, and plays a central role of analyzing and calculating data. The CPU 2250 internally includes a processor register in which commands to be processed are stored; an arithmetic logic unit (ALU) used for comparison, determination and calculation; a control unit internally controlling the CPU 2250 to analyze and properly execute a command; an internal bus (BUS); a cache; etc.

The CPU 2250 performs calculations needed for operating the elements of the signal processor 2240, such as the demultiplexer 2241, the video processor 2242 and the audio processor 22343. However, some elements of the signal processor 2240 may be designed to operate without data calculation of the CPU 2250 or may operate with a separate micro-controller.

The methods according to the foregoing exemplary embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the exemplary embodiments. The program command recorded in this storage medium may be specially designed and configured according to the exemplary embodiments, or may be publicly known and available to those skilled in the art of computer software.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A display apparatus comprising:
   a flexible display panel;
   an image processing board configured to output a video signal to the display panel; and
   a support member provided between the display panel and the image processing board and configured to support the display panel,
   the support member comprising:
   at least two plates arranged in a matrix along one side of the display panel; and
   at least one artificial muscle connecting the at least two plates and configured to be deformed to change a shape of the support member in accordance with a voltage applied thereto.

2. The display apparatus according to claim 1, further comprising:
   at least one sensor configured to sense a bending state of the artificial muscle when the artificial muscle is bent by an external force; and
   a controller provided in the image processing board and configured to apply the voltage to the artificial muscle so that the artificial muscle can maintain the bending state in response to the sensor sensing that the artificial muscle is bent.

3. The display apparatus according to claim 2, wherein the controller is configured to apply the voltage to the artificial muscle in response to the bending state of the artificial muscle being maintained by the external force for a preset period of time from a point of time when the artificial muscle is bent to a certain shape.

4. The display apparatus according to claim 2, further comprising a storage configured to store a plurality of voltage levels respectively designated to maintain a plurality of transformed shapes of the artificial muscle,
wherein the controller is configured to read a voltage level, which corresponds to the bending shape of the artificial muscle sensed by the sensor, from the storage and apply a voltage of the read voltage level to the artificial muscle.

5. The display apparatus according to claim 2, wherein the sensor is configured to sense whether the external force is caused by a user, and
the controller is configured to apply the voltage to the artificial muscle in response to the sensor sensing that the external force is caused by a user, and to not apply the voltage to the artificial muscle in response to the sensor sensing that the external force is not caused by the user.

6. The display apparatus according to claim 2, wherein the sensor is configured to sense at least one from among a bending angle, a bending duration time and a bending pressure of the artificial muscle.

7. The display apparatus according to claim 1, further comprising a controller configured to control the display panel to display a user interface (UI) through which a user can designate the bending shape of the support member, and to apply the voltage to the artificial muscle so that the support member can be bent in response to user input from the UI.

8. The display apparatus according to claim 7, further comprising a storage configured to store a plurality of voltage levels respectively designated to maintain a plurality of transformed shapes of the artificial muscle,
wherein the controller is configured to read a voltage level, which corresponds to the bending shape of the artificial muscle sensed by the sensor, from the storage and apply voltage of the read voltage level to the artificial muscle.

9. The display apparatus according to claim 1, wherein the at least one artificial muscle comprises a pair of artificial muscles arranged in parallel with each other and connecting the at least two plates.

10. The display apparatus according to claim 1, wherein the channel support member further comprises a supporting plate configured to support an untransformable area between a transformable area and the untransformable area of the display apparatus, and
the at least two plates and the at least one artificial muscle support the first area.

11. The display apparatus according to claim 10, wherein the image processing board is accommodated in the untransformable area.

12. The display apparatus according to claim 1, further comprising:
a housing comprising at least one hinge at which the display apparatus can be bent; and
at least one battery accommodated in an area separate from the hinges of the housing so as not to interfere with a bending operation of the housing.

13. The display apparatus according to claim 1, wherein the image processing board comprises:
a plurality of flexible substrates arranged in parallel with a rear surface of the display panel;
a flexible die forming gaps with regard to the plurality of substrates and arranged between the plurality of substrates in parallel with the display panel; and
a flexible wiring film supporting upper surfaces of the die and the plurality of substrates and electrically connecting the plurality of substrates and the die.

14. The display apparatus according to claim 13, wherein at least one cavity is formed along lower surfaces of at least one of the plurality of substrates and the die.

15. The display apparatus according to claim 13, wherein the image processing board further comprises a bonding film that bonds the plurality of substrates and the die and electrically connects the plurality of substrates and the die to wiring film, and
the bonding film comprising:
a bonding member arranged in a row along an extending direction of the wiring film and bonding the plurality of substrates and the die to the wiring film; and
an electric conductor embedded in the bonding member and electrically connected to a wiring line of the wiring film.

16. The display apparatus according to claim 15, wherein the bonding film comprises a plurality of unit films arranged in a row along the extending direction of the wiring film, and each unit film of the plurality of comprises the electric conductor and the bonding member.

17. The display apparatus according to claim 15, wherein at least one cavity is formed along at least one of an upper surface and a lower surface of the bonding member.

18. The display apparatus according to claim 1, wherein the image processing board comprises:
a flexible substrate arranged in parallel with a rear surface of the display panel and having an accommodating area formed by a recess in an area of an upper surface of the flexible substrate;
a flexible die accommodated in the accommodating area to form a gap with regard to the substrate and arranged in parallel with the rear surface of the display panel; and
a flexible wiring film supporting upper surfaces of the die and the substrate and electrically connecting the substrate and the die.

19. The display apparatus according to claim 18, wherein at least one cavity is formed along a lower surface of at least one of the substrate and the die.

20. The display apparatus according to claim 18, wherein the image processing board further comprises a bonding film that bonds the substrate and the die and electrically connects the substrate and the die to wiring film, and
the bonding film comprising:
a bonding member arranged in a row along an extending direction of the wiring film and bonding the substrate and the die to the wiring film; and
an electric conductor embedded in the bonding member and electrically connected to a wiring line of the wiring film.

21. The display apparatus according to claim 20, wherein the bonding film comprises a plurality of unit films arranged in a row along the extending direction of the wiring film and comprising the electric conductor and the bonding member.

22. The display apparatus according to claim 20, wherein at least one cavity is formed along at least one of an upper surface and a lower surface of the bonding member.

23. A display apparatus comprising:
a flexible display panel;
an image processing board configured to process a video signal to be output to the display panel; and
a support member provided between the display panel and the image processing board and configured to support the display panel,
the support member comprising:
a plurality of rigid plates arranged in a matrix along one side of the display panel; and
a plurality of electrically transformable members connecting the plurality of plates, wherein each of the plurality of electrically transformable members is configured to be deformed in response application of a voltage to change a shape of the display apparatus.

24. The display apparatus of claim 23, further comprising:
at least one sensor configured to sense a bending state of the display apparatus is bent by an external force applied the display apparatus; and
a controller configured to apply the voltage to at least one of the plurality of electrically transformable members so that the display apparatus is maintained in the bending state after the external force is removed.

25. The display apparatus of claim 23, wherein in the sensor is configured to sense whether the external force is applied by a user, and
the controller is configured to apply the voltage to the at least one of the plurality of electrically transformable members in response to the sensor sensing that the external force is caused by a user, and to not apply the voltage to the at least one of the plurality of electrically transformable members in response to the sensor sensing that the external force is not caused by the user.

* * * * *